(12) United States Patent
Gordon et al.

(10) Patent No.: US 6,208,335 B1
(45) Date of Patent: *Mar. 27, 2001

(54) METHOD AND APPARATUS FOR PROVIDING A MENU STRUCTURE FOR AN INTERACTIVE INFORMATION DISTRIBUTION SYSTEM

(75) Inventors: Donald Gordon, Pacific Grove; Christopher Goode, Menlo Park; Philip A. Thomas, San Jose; Mark D. Conover, Cupertino; Brooks Cole, Point Reyes Station, all of CA (US)

(73) Assignee: Diva Systems Corporation, Redwood City, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/984,427

(22) Filed: Dec. 3, 1997

Related U.S. Application Data

(60) Provisional application No. 60/034,490, filed on Jan. 13, 1997.

(51) Int. Cl.[7] ........................................ G06F 13/00
(52) U.S. Cl. .......................... 345/327; 348/563; 348/331
(58) Field of Search .................................. 345/327, 352, 345/146, 353, 331, 332; 348/731, 570, 906, 563, 569, 739

(56) References Cited

U.S. PATENT DOCUMENTS

| 4,706,121 | 11/1987 | Young | 358/142 |
|---|---|---|---|
| 4,751,578 | 6/1988 | Reiter et al. | 358/183 |
| 4,860,123 | 8/1989 | McCalley et al. | 358/342 |
| 4,885,775 | 12/1989 | Lucas | 380/10 |
| 4,908,713 | 3/1990 | Levine | 358/335 |
| 4,991,011 | 2/1991 | Johnson et al. | 358/141 |
| 5,038,211 | 8/1991 | Hallenbeck | 358/142 |
| 5,070,400 | 12/1991 | Lieberman | 358/84 |
| 5,151,789 | 9/1992 | Young | 358/194.1 |
| 5,182,640 | 1/1993 | Takano | 358/86 |

(List continued on next page.)

FOREIGN PATENT DOCUMENTS

94/30008   12/1994   (WO) ............................ H04N/5/262

*Primary Examiner*—Raymond J. Bayerl
*Assistant Examiner*—Tadesse Hailu
(74) *Attorney, Agent, or Firm*—Thomason, Moser & Patterson LLP

(57) ABSTRACT

A method and apparatus for providing an interactive menu structure within an interactive information distribution system. The menu structure is embodied in a combination of software, which provides a so-called navigator and a set top terminal that provides certain functionality for the navigator and a video session manager which provides support functionality for the set top terminal. The menu structure has each menu (e.g., menu instructions, graphics and video) contained in downloadable applets which are sent upon request from the service provider equipment to the set top terminal for display. As such, the navigator functions are actually distributed between the service provider equipment and the subscriber's equipment. Such distribution provides an enjoyable, real-time interactive session that allows the user to rapidly navigate through a plethora of menus to find particular information which they desire to view.

23 Claims, 20 Drawing Sheets

U.S. PATENT DOCUMENTS

| | | | |
|---|---|---|---|
| 5,307,173 | 4/1994 | Yuen et al. | 358/335 |
| 5,357,276 | 10/1994 | Banker et al. | 348/7 |
| 5,359,601 | 10/1994 | Wasilewski et al. | 370/73 |
| 5,400,402 | 3/1995 | Garfinkle | 380/20 |
| 5,410,367 | 4/1995 | Zahavi et al. | 348/725 |
| 5,477,262 | 12/1995 | Banker et al. | 348/7 |
| 5,479,266 | 12/1995 | Young et al. | 358/335 |
| 5,479,268 | 12/1995 | Young et al. | 358/335 |
| 5,485,197 | 1/1996 | Hoarty | 348/7 |
| 5,508,815 | 4/1996 | Levine | 358/385 |
| 5,515,106 | 5/1996 | Chaney et al. | 348/461 |
| 5,530,754 | 6/1996 | Garfinkle | 380/5 |
| 5,532,754 | 7/1996 | Young et al. | 348/569 |
| 5,550,576 | 8/1996 | Klosterman | 348/6 |
| 5,568,272 | 10/1996 | Levine | 386/48 |
| 5,585,838 | 12/1996 | Lawler et al. | 348/13 |
| 5,585,866 | 12/1996 | Miller et al. | 348/731 |
| 5,594,509 | 1/1997 | Florin et al. | 348/731 |
| 5,596,373 | 1/1997 | White et al. | 348/569 |
| 5,619,249 | 4/1997 | Billock et al. | 348/7 |
| 5,625,406 | 4/1997 | Newberry et al. | 348/7 |
| 5,644,354 | 7/1997 | Thompson et al. | 348/13 |
| 5,710,601 | 1/1998 | Marshall et al. | 348/564 |
| 5,903,816 | 5/1999 | Broadwin et al. | 455/3.1 |
| 5,966,162 * | 10/1999 | Goode et al. | 348/10 |
| 5,987,245 * | 11/1999 | Gish | 395/680 |
| 6,002,394 * | 12/1999 | Schein et al. | 345/327 |

* cited by examiner

METHOD AND APPARATUS FOR PROVIDING A MENU STRUCTURE FOR AN INTERACTIVE INFORMATION DISTRIBUTION SYSTEM

This application claims benefit of U.S. provisional patent application Ser. No. 60/034,490, filed Jan. 13, 1997, pending the disclosure of which is herein incorporated by reference.

BACKGROUND OF THE INVENTION

1. Field of the Invention

The present invention relates to an interactive information distribution system such as a video-on-demand (VOD) system. More particularly, the present invention relates to a method and apparatus for providing an interactive menu structure, i.e., an on-screen program guide, for such an interactive information distribution system.

2. Description of the Background Art

Recent advances in digital signal processing techniques, and in particular, improvements in digital compression techniques, have led to a plethora of proposals for providing new digital services to a customer's home via existing telephone and coaxial cable networks. For example, it has been proposed to provide hundreds of cable television channels to subscribers by compressing digital data, digital video, transmitting compressed digital video over conventional coaxial cable television channels, and then decompressing the video in the subscriber's set top terminal. Another proposed application for this technology is a video-on-demand system in which a subscriber communicates directly with a video service provider via telephone lines to request a video program from a video library and the requested video program is routed to the subscriber's home via telephone lines or via coaxial cable television cables for immediate viewing. Other proposed video-on-demand systems use a frequency multiplexing technique to enable control information for a set top terminal to be transmitted through a cable network back to an information server. Such a system permits bi-directional communication over a single network.

In each of these information distribution systems, menus are displayed upon the subscriber's television and using a remote control device, a subscriber selects a desired program for viewing. A program code is then sent from the set top terminal through the communication system back to the service provider. The selected program is then recalled from memory by the service provider equipment and broadcast to the set top terminal that requested that information. Alternatively, the subscriber may telephone the service provider and request certain information that is displayed in a menu upon the subscriber's television or the subscriber's set top terminal or television set may automatically tune, in response to the menu selection, to a broadcast channel to receive information transmitted on that channel. In any event, the currently available systems generally do not provide an interactive menu structure through which to select programming. Usually the menus are rudimentary text listings of available programs. By scrolling through the lists of programs using a remote control device the user selects desired programming. These text-based menus do not contain any graphics, video, or other material that would provide an entertaining interactive session. Two such systems are disclosed in U.S. Pat. No. 5,357,276 issued Oct. 18, 1994 and 5,477,262 issued Dec. 19, 1995.

Therefore, there is a need in the art for a method and apparatus for providing an improved interactive menu structure for an interactive information distribution system.

SUMMARY OF THE INVENTION

The disadvantages heretofore associated with the prior art are overcome by the present invention of a method and apparatus for providing an improved interactive menu structure for an on-screen program guide within an interactive information distribution system. The invention is embodied in a combination of software, which provides a so-called "navigator," and hardware, including a set top terminal that provides certain functionality for the navigator and a video session manager which supports the functionality of the set top terminal. As such, the navigator functions are distributed between service provider equipment (video session manager) and subscriber equipment (set top terminal). Such distribution provides an enjoyable, real-time interactive session that allows the subscriber to rapidly navigate through a plethora of menus to find particular information which the subscriber desires to view.

More specifically, the interactive information distribution system comprises service provider equipment connected to subscriber equipment through a communications network. The service provider equipment includes an information server coupled to a video session manager. The video session manager contains a modulator for modulating information provided by the server into a form that can be transmitted through the network to the subscriber equipment. The video session manager also contains a modem for communicating command and control information between the service provider equipment and subscriber equipment.

The subscriber equipment includes a set top terminal that is connected to a display device such as a television and an input device such as an infrared (IR) or radio-frequency (RF) remote control. The user while viewing the display device may select a number of menus using the input device as the menus are presented from the set top terminal upon the television screen. Any commands which the user transmits to the set top terminal that are not handled by the set top terminal itself are communicated through the network to the service provider equipment, demodulated by the modem and implemented by the video session manager. The video session manager forms an interface between the modem and the server such that the video session manager may coordinate billing, ensure that proper programming is sent through the network and addressed properly to the set top terminal requesting that programming, and interact with the server.

A navigator menu structure is a series of interconnected "applets" (e.g., a linked list of programs). Each applet contains certain data for producing interactive menu imagery (screen) as well as control instructions that provide functionality for the menu. The applet data generally contains two components. There are the underlying video images (background video) which provides so-called entertaining "eye candy" and selectable icons for the viewer. Additionally, there is an overlay screen which provides the interactive functionality and command structure for the navigator. The overlay screen is produced using the on-screen display (OSD) functions of a video decoder within the set top terminal. Particular applets are sent through the network to the set top terminal in response to a particular command from the subscriber.

Specifically, when a subscriber selects a functional icon within a given menu, an applet for a new menu corresponding to the selected icon is downloaded from the server through the modem and the network to the set top terminal. The applet is contained in a compressed, packetized video stream. This stream conforms to the compression and transport protocols of a standard video transmission protocol such as the Moving Pictures Experts Group (MPEG) protocol.

As soon as the background video associated with the applet is available for display, the video decoder displays the video on the television screen. Additionally, the OSD overlay(s) are displayed "over" the background video. These OSD graphics facilitate certain interactive functions such that when the user manipulates a joystick or other selection instrument particular regions are visibly altered, e.g., the regions become highlighted. The user then selects a highlighted region for implementation of a function represented by the highlighted region. The region generally changes in some manner indicating that that graphic has been selected. The display of the overlays is handled by a microprocessor within the set top terminal as well as an on-screen display graphics processor within the video decoder of the set top terminal. Selecting a region or icon on the screen will send a command to the video session manager for implementation. In response, the video session manager sends a new applet representing another menu (e.g., the next applet in the linked list) or a multimedia selection such as a movie.

The navigator menu structure may be conveniently described in terms of a video layer, a graphics layer and a control layer. The video layer comprises the displayed video images produced using, e.g., information contained in an applet. The graphics layer comprises OSD overlay(s) including graphical objects which are associated with applets stored in either subscriber or provider equipment. The OSD overlay(s) are displayed over the video layer. As such, the OSD layer can be used to emphasize and de-emphasize the underlying video. In particular, the graphics can be transparent (or have some level of transparency) to allow much of the underlying video to be seen while positioning certain graphics upon the video, and/or the OSD graphics can be opaque such that, by turning the graphics on and off the underlying video is either masked or revealed. The control layer comprises a command processing and logical operations layer. The control layer retrieves the applets associated with graphic layer objects selected by a user, executes the applets, provides video information to the video layer and objects information to the graphics layer.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention is a method and apparatus that provides an improved interactive menu structure for an on-screen program guide for use with an information distribution system. The inventive menu structure shall hereinafter be referred to as a "navigator". Although the navigator of the present invention can be implemented and executed using a number of different types of information distribution system, the preferred embodiment is used in combination with the hardware described below. The interactive information distribution system described below is disclosed in detail in United States provisional patent application 60/034,489 filed Jan. 13, 1997 and incorporated herein by reference. However, this specific hardware arrangement is considered illustrative of the type of system with which the invention is used. Any other hardware arrangement that facilitates information distribution is considered within the scope of the invention.

Figure 1:
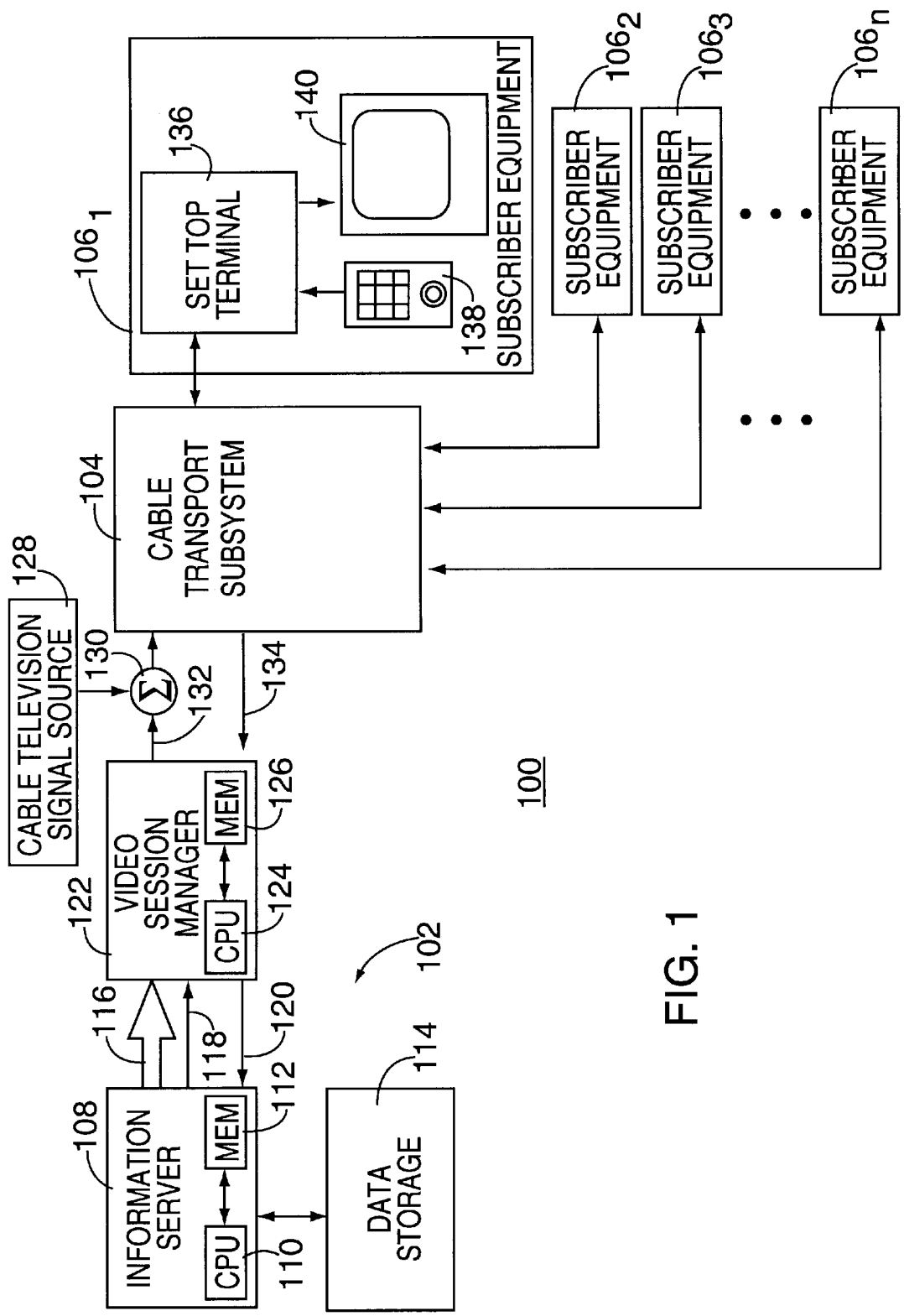
FIG. 1 depicts a high level block diagram of an interactive information distribution system containing the present invention.

FIG. 1 depicts a high level block diagram of the illustrative information distribution system 100 that incorporates the present invention. The system contains service provider equipment 102, a communications network 104 and subscriber equipment $106_n$, where n is an integer greater than zero. The service provider equipment 102 contains an information server 108 which is typically a parallel processing computer containing at least one central processing unit 110 and associated memory 112. The server interacts with a data storage device 114 (e.g., a disk drive array) that generally stores the subscriber information (e.g., video data) that will be recalled and downloaded to the subscriber. Additionally, within the service provider equipment is a video session manager 122 that provides session control of the information flowing to and from the server. Furthermore, the video session manager 122 contains its own central processing unit 124 and associated memory 126.

The information server 108 is coupled to the video session manager via data path 116, synchronization clock path 118 and control path 120. The server 108 provides data streams on path 116 and a synchronization clock on path 118 in response to requests for information from the video session manager on path 120. These data streams are packetized and modulated onto a carrier that is compatible with the transmission requirements of the network 104.

The video session manager 122 accomplishes all of the transmission interface requirements of the system 100. Specifically, the video session manager 122 is coupled to subscriber equipment via a forward information channel 132, a forward command channel 133 and a back channel 134. All three of these channels are supported by the cable transport network. The video session manager contains a modulator for modulating the server data streams onto one or more carrier frequencies for transmission on the forward information channel. Additionally, the video session manager contains a modem for sending control information via the forward command channel and receiving control information via the back channel. Moreover, a conventional cable television signal source 128 is optionally coupled to the forward information channel via a signal coupler 130.

The network 104 can be any one of a number of conventional broadband communications networks that are available such as a fiber optic network, a telephone network, existing cable television network and the like. For example, if the network is a hybrid fiber-coax network, the transmission transport technique used in both forward channels may be modeled after the Moving Pictures Expert Group (MPEG) transport protocol for the transmission of video data streams. In general, the transport mechanism for both of the forward channels that transport information to the set top terminal must be able to carry unidirectional, asynchronous packetized data such as that defined in the MPEG video and audio signal transmission protocol, and the like. There are a number of such transport protocols available.

Each set top terminal 106 receives the data streams from the forward information channel, demodulates those streams and processes them for display on the display device 140 (e.g., a conventional television). In addition, the set top terminal 106 accepts commands from a remote control input device 138 or other input device. These commands are formatted, compressed, modulated, and transmitted through the network 104 to the video session manager 122. Typically, this transmission is accomplished through the back channel 134. These commands are preferably transmitted through the same network used to transmit information to the set top terminal. However, the back channel coupling the set top terminal to the server may be a separate network, e.g., a forward information channel through a television cable network and a back channel through a telephone network. The telephone network could also support the forward control channel. The video session manager 122 interprets each command sent from the set top terminal through the back channel and instructs the information server to perform certain functions to implement the subscriber request.

Figure 2:
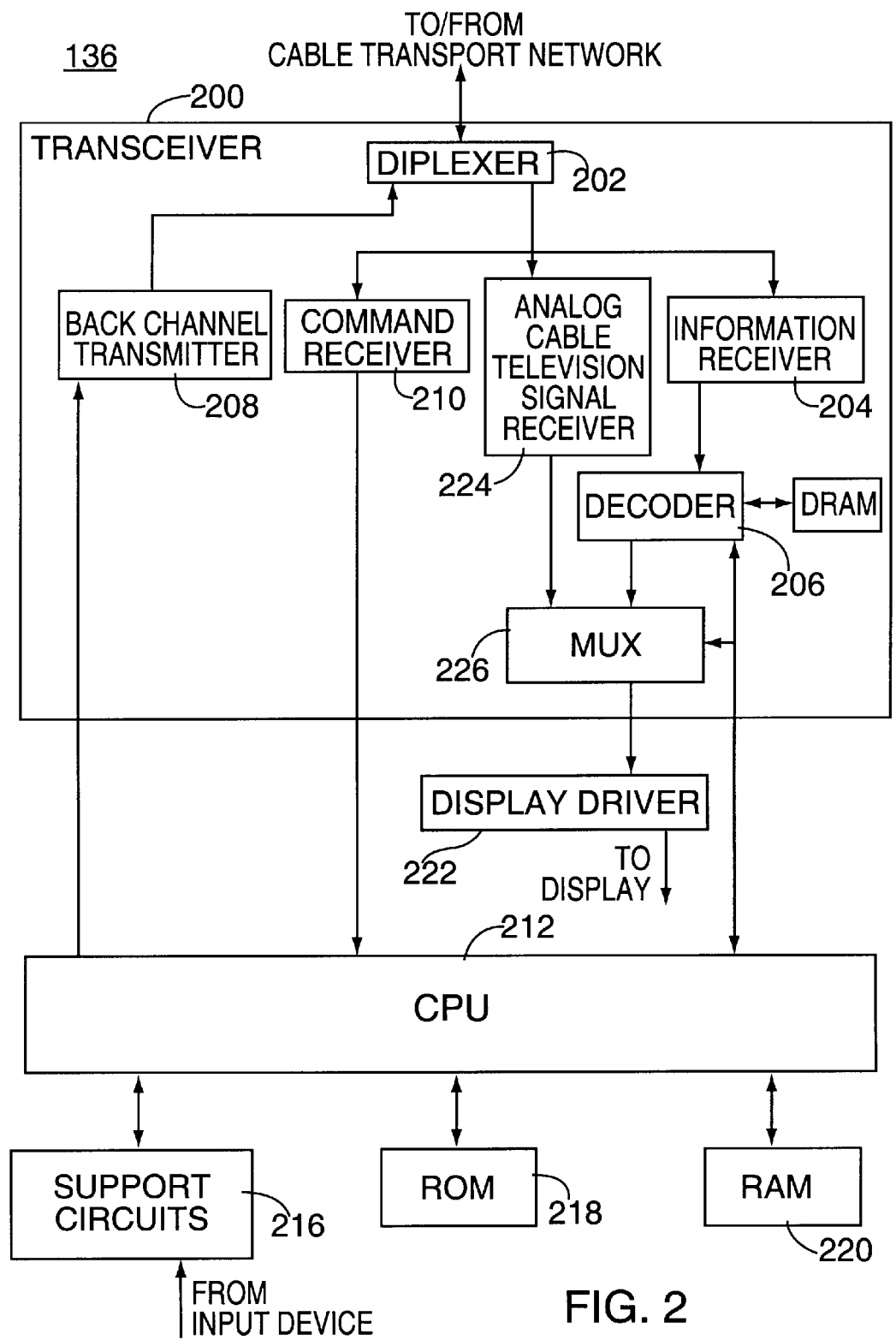
FIG. 2 depicts a block diagram of an illustrative set top terminal within the system of FIG. 1.

FIG. 2 depicts a block diagram of the set top terminal 136 which contains a transceiver 200, a central processing unit (CPU) 212 and a display driver 222. Of course, the functionality of the set top terminal 136 can be embedded within a single consumer electronics product such a television. As such, the description of a stand-alone set top terminal should be considered illustrative of the type of subscriber equipment that may be used to implement the present invention. Within the set top terminal 136, the CPU 212 is supported by random access memory (RAM) 220, read only memory (ROM) 218 and various support circuits 216 such as clocks, power supply, an infrared receiver and the like. The transceiver 200 contains a diplexer 202, a back channel transmitter 208, an information channel receiver 204, a command channel receiver 210, an information decoder 206, a conventional television signal receiver 224, and a multiplexer 226. The diplexer 202 couples the three channels carried by a single cable within the network to the transmitter and receivers.

Each receiver 204 and 210 contains a tuner, amplifiers, filters, a demodulator, and a depacketizer. As such, the receivers tune, downconvert, and depacketize the signals from the cable network in a conventional manner. The information channel receiver 204 contains a conventional QAM demodulator such as a model BCM3115 manufactured by the Broadcom Corporation. Other such demodulators are well-known in the communications arts and could be used in this application. However, this particular QAM demodulator also contains a built in "out-of-band" QPSK demodulator for handling command channel data carried by the forward command channel. As such, a single integrated circuit demodulates both subscriber requested information (audio and video) as well as command data.

The decoder 206 processes the data packets carrying subscriber requested information produced by the QAM demodulator into useable signals for the end user display, e.g., television, home studio, video recorder and the like. The decoder is coupled to a dynamic random access memory (DRAM) to facilitate decoding of the data packets and processing of applets, as shall be discussed below. The signals for display are conventionally processed by a display driver 222 to produce composite video as well as a conventional television signal, e.g., modulated onto channel 3 or 4 using the NTSC standard modulation.

The conventional cable television signal receiver 224 contains a tuner and an analog (NTSC) demodulator. A multiplexer 226 couples the demodulated analog or decoded video signal to the display drive 222. Of course, the NTSC demodulator can be replaced with a PAL or SECAM standard demodulator, as needed.

The demodulated QPSK signal provides command and control information to the CPU 212 for generating certain graphics and control interface regions upon a television screen. The CPU is, for example, a Model 68302 processor manufactured by Motorola. This processor, operating in combination with the decoder 206 as well as a continuously available video signal from the information channel, produces screen displayed buttons, icons and graphical regions with which a subscriber interacts using the remote control. Without the video signal the set top terminal does not produce any display, i.e., the displays are actively generated in real time as needed to facilitate certain navigation functions.

Specifically, a joystick on the remote control selectively highlights certain pre-defined regions of the television screen. To perform such highlighting, a reference region is always highlighted when a menu is first displayed. From that reference region, direction vectors produced by the joystick are interpreted by the CPU to highlight a region lying in the direction in which the joystick was moved. When a desired selectable icon is highlighted, the subscriber depresses a "select" key on the remote that sends an infrared signal to an infrared receiver (a support circuit 216). This receiver sends the select command to the CPU for interpretation. The selected region is associated with a function. If the function is a request for specific information or a change in the menu, the processor formats the command and sends it to the back channel transmitter for transmission to the video session manager. If the command is a function that is handled locally such as volume control, the CPU implements the function within the set top terminal.

Since the session control commands are implemented by the video session manager and not the set top terminal alone, the number of available session control commands is infinite. Each command is implemented by the execution of an applet, as described below. The applets control both information sessions, e.g., the presentation of video to the television screen, and navigator functions, e.g., the menus that facilitate selection of a video program. As such, particular commands include, but are not limited to, information or menu navigation commands, movie start at beginning, movie start at the middle, play, stop, rewind, forward, pause, and the like. These presentation and navigation control commands are sent via a back channel transmitter 208 using binary phase shift key (BPSK) modulation. Additionally, the CPU in the set top terminal implements certain local commands such as increment or decrement the volume, channel change, and on/off.

The invention is implemented as one or more interrelated "applets" which, when taken together, form the navigator of the present invention. The applets are transmitted, for the most part, to the set top terminal via the forward information channel. Certain information used by particular applets is transmitted to the set top terminal via a data stream propagated through the forward command channel. As such, the data stream carrying the applet is demodulated, the applet extracted and the applet's information decoded prior to execution that displays a menu on the display device. The detailed process by which an applet is downloaded and used to produce a menu is disclosed with respect to FIGS. 6 and 7 below.

Figure 3:
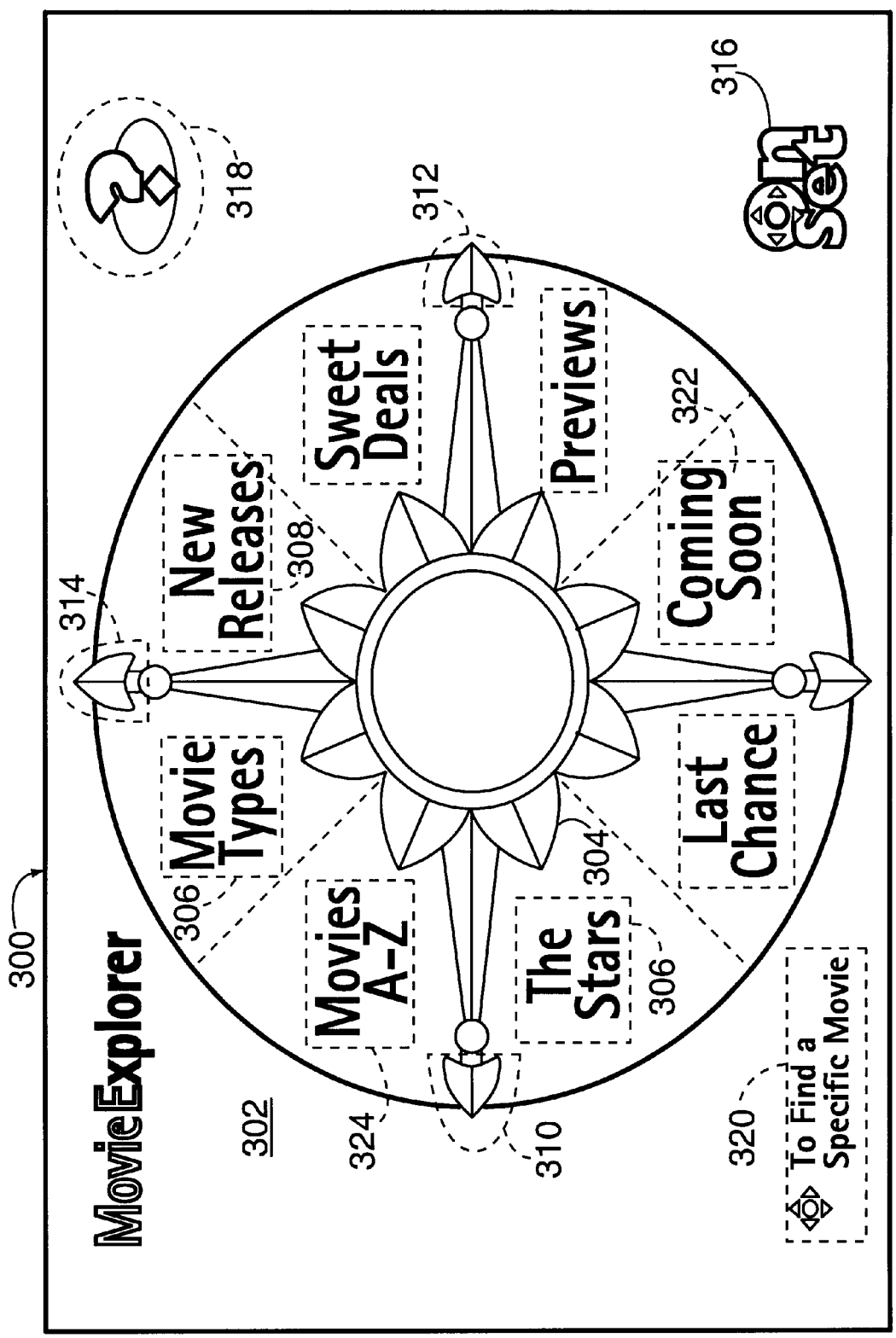
FIG. 3 depicts an illustrative "compass" menu display.
Figure 10:
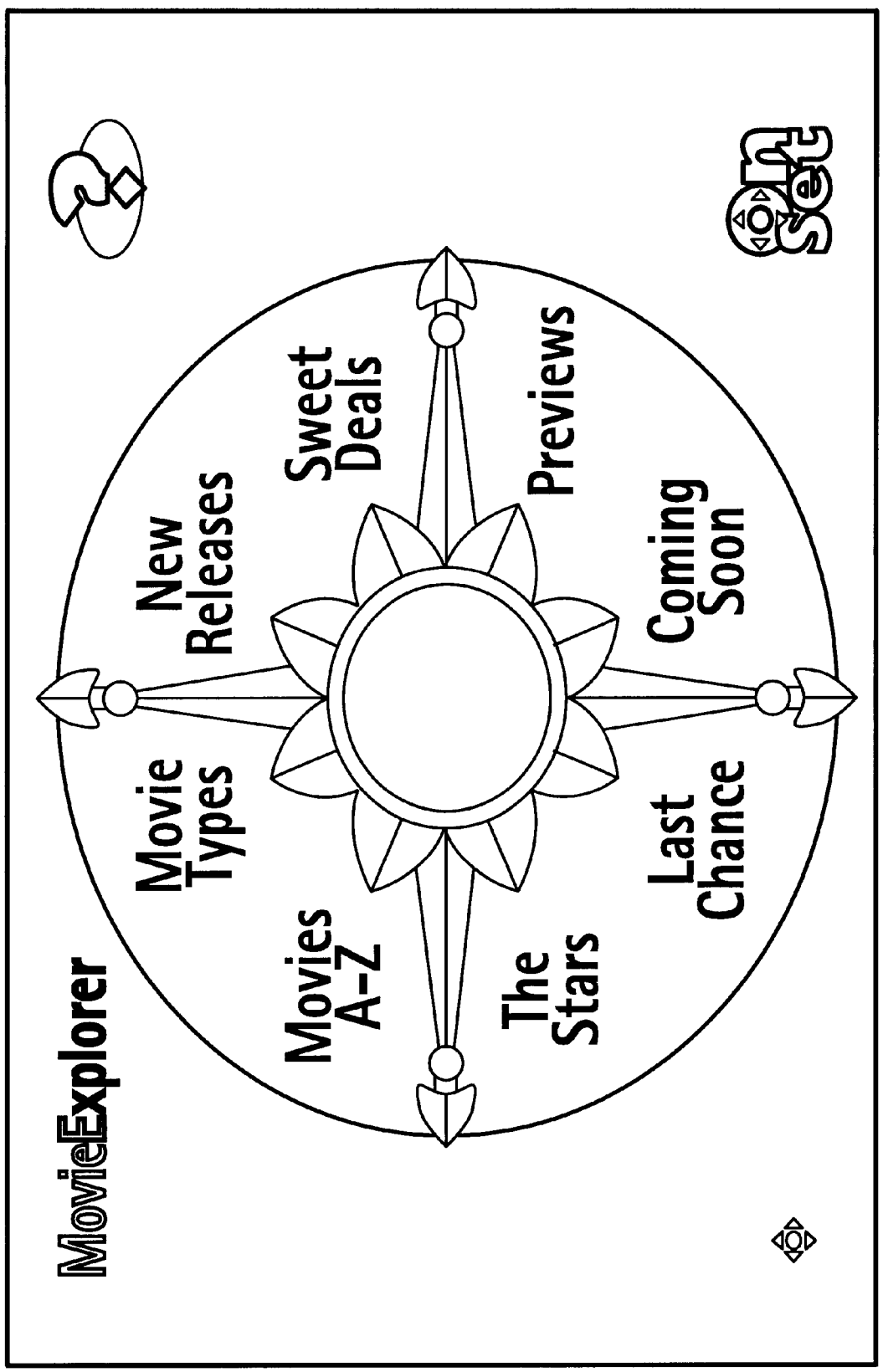
FIG. 10 depicts a "compass" menu.
Figure 11:
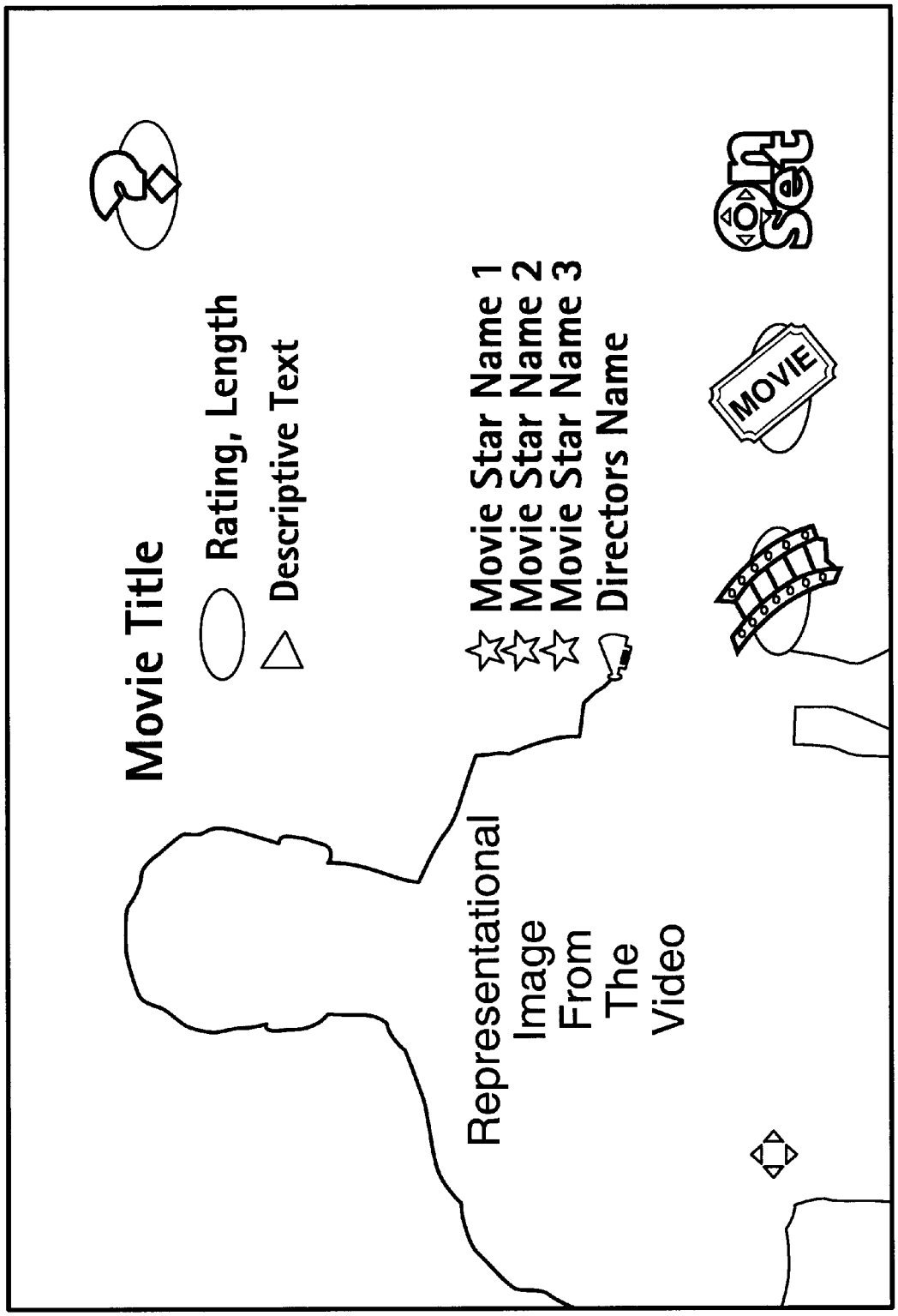
FIG. 11 depicts a movie information screen.
Figure 12:
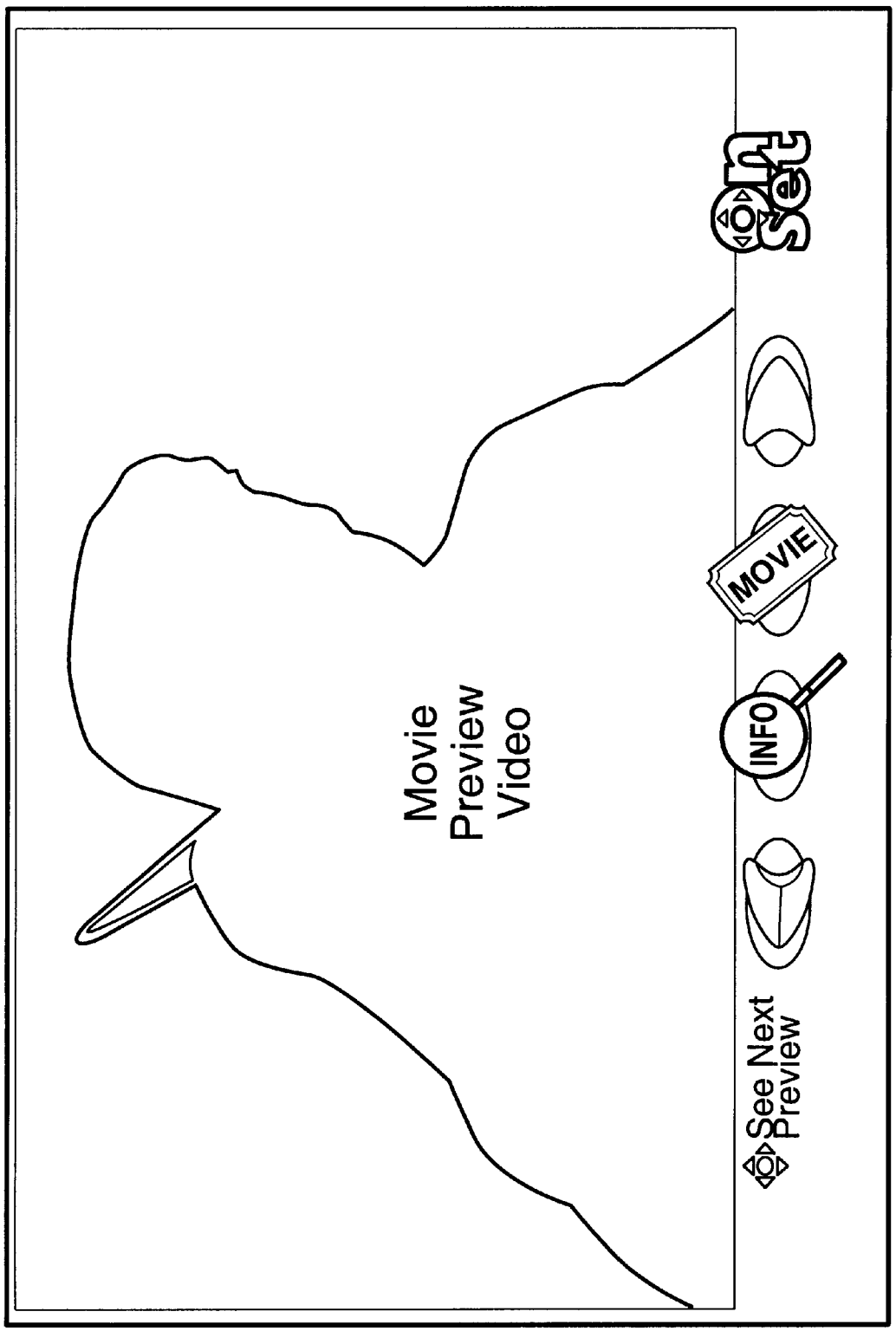
FIG. 12 depicts preview screen.
Figure 13:
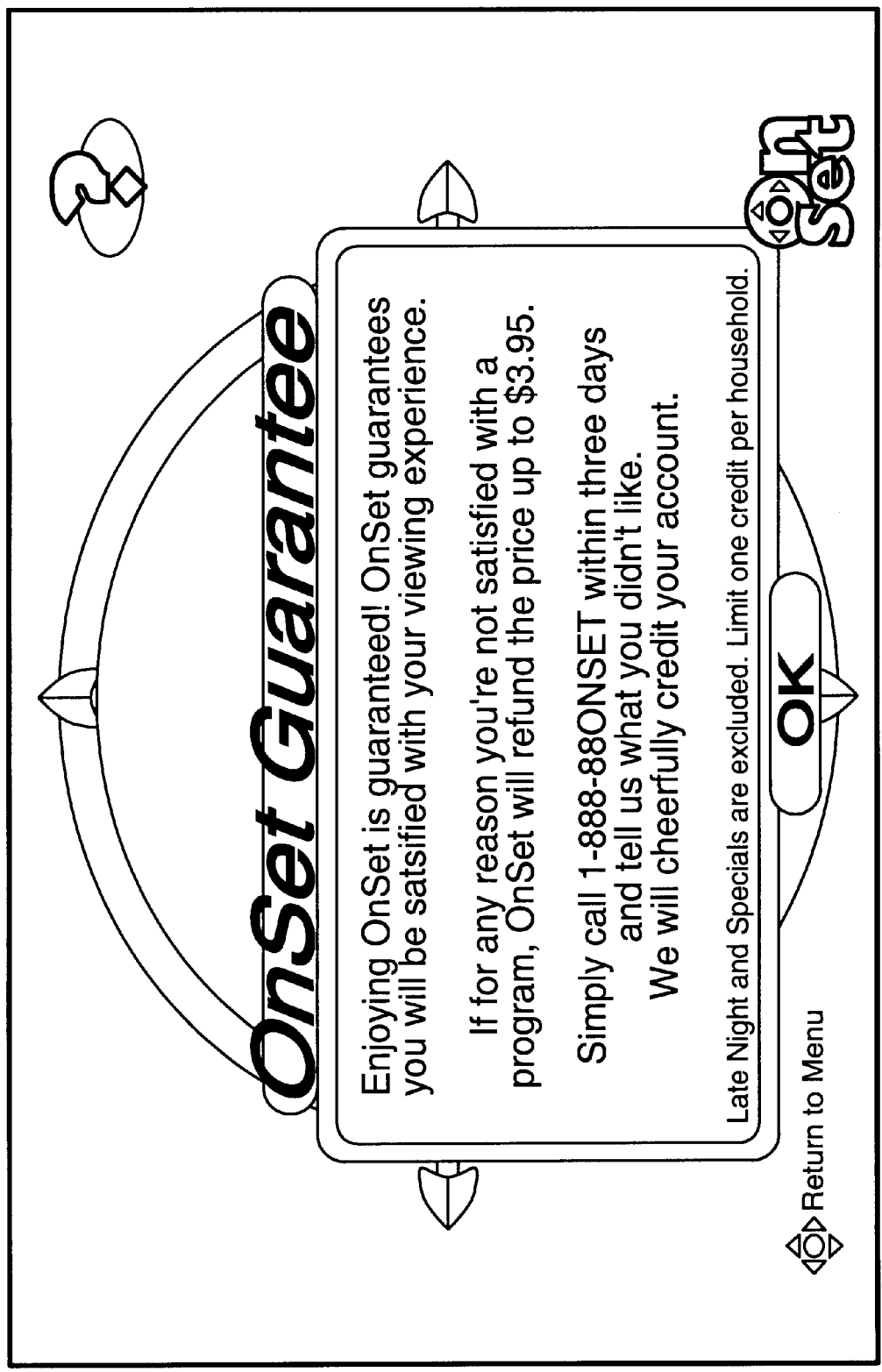
FIG. 13 depicts a guarantee screen.
Figure 14:
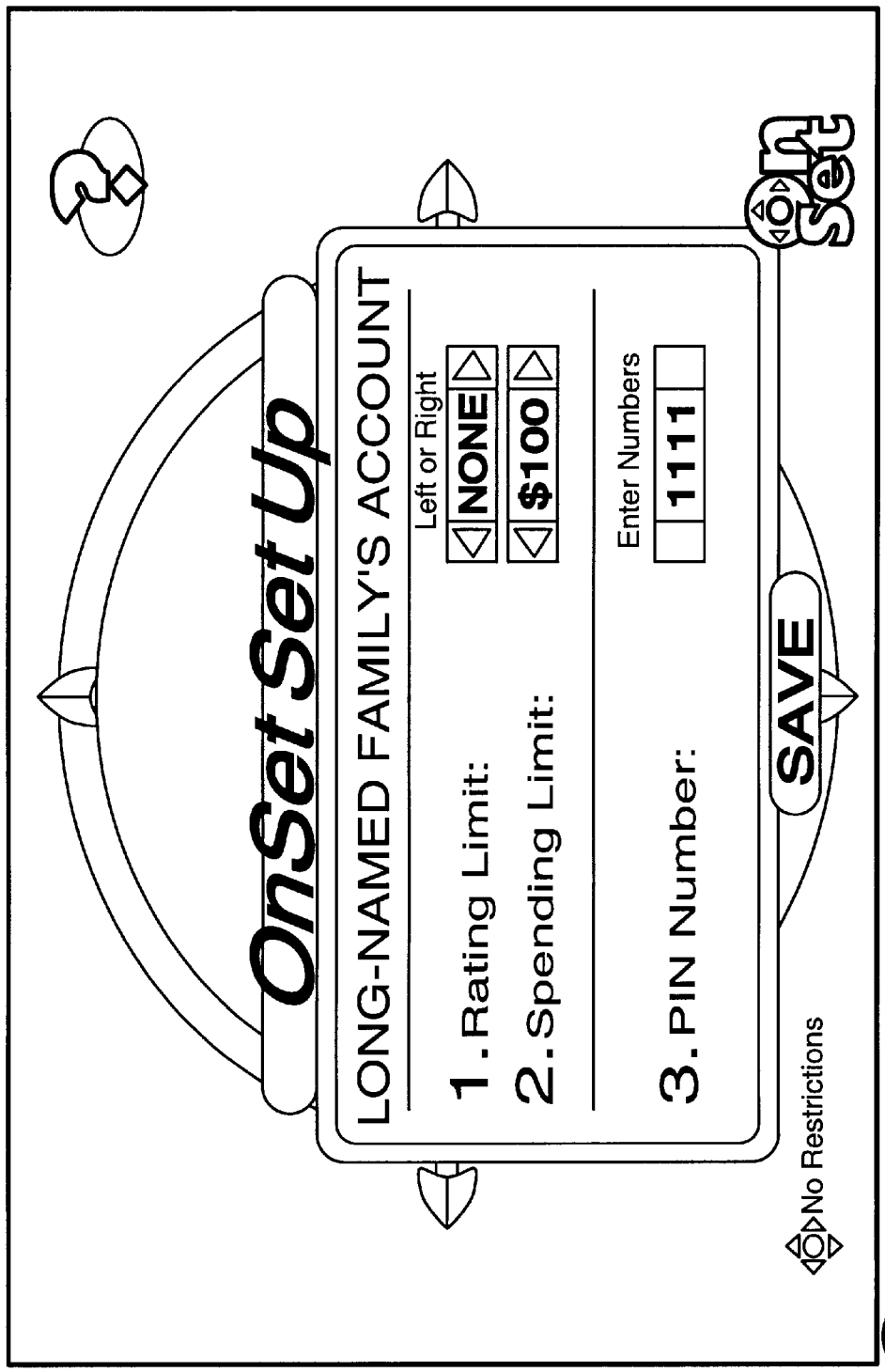
FIG. 14 depicts a set up screen.
Figure 15:
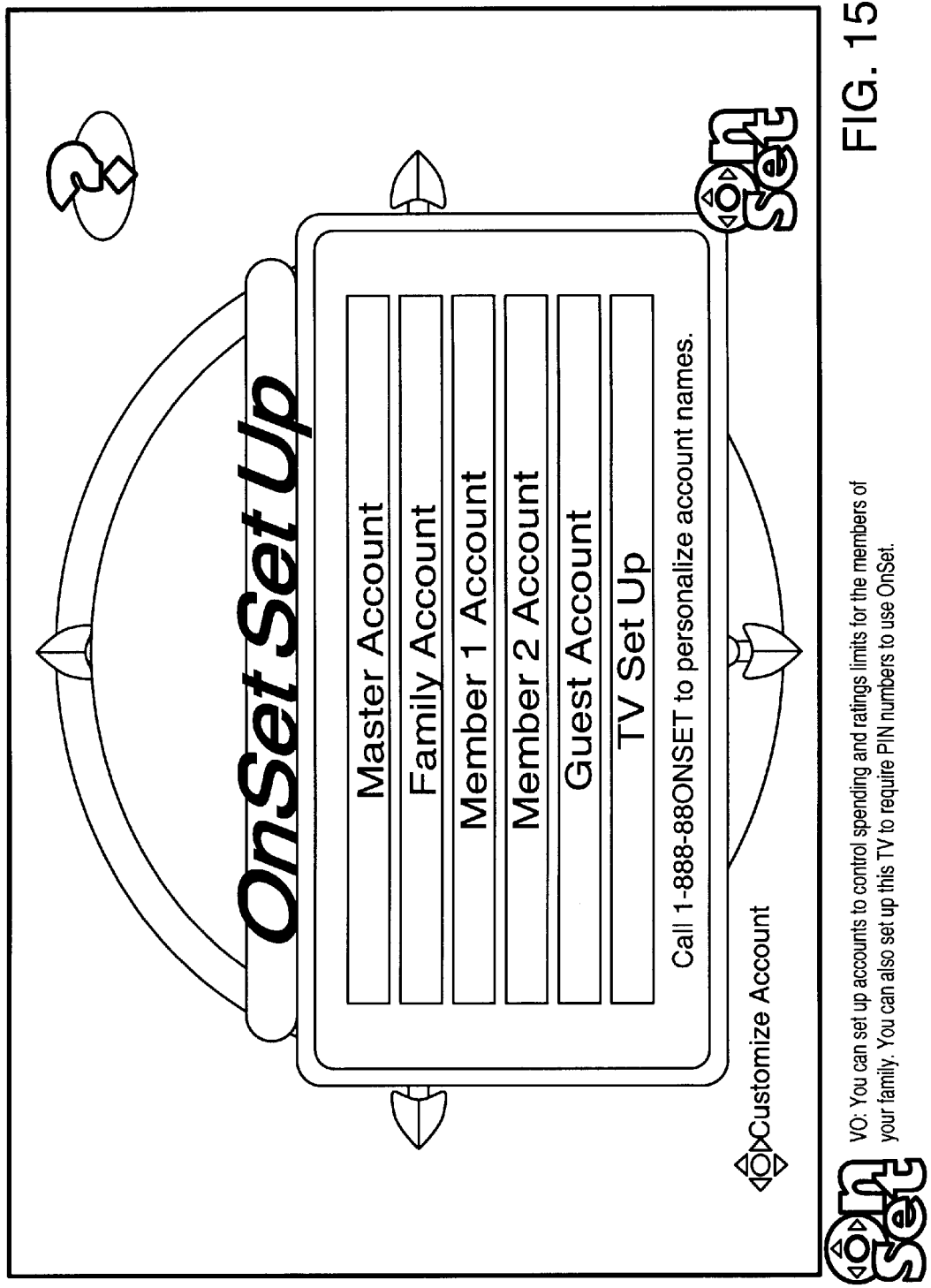
FIG. 15 depicts a set up menu.
Figure 16:
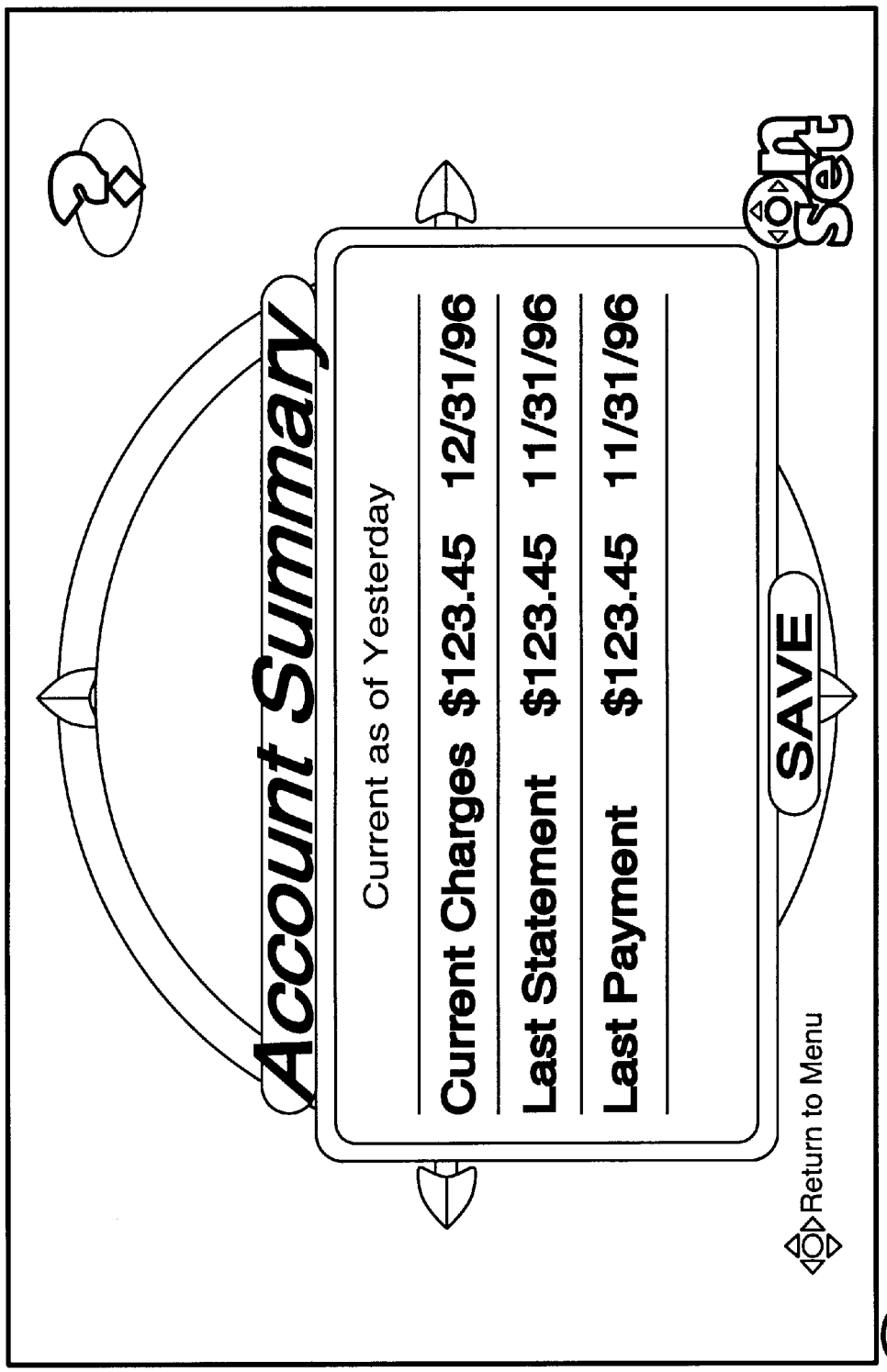
FIG. 16 depicts a account summary.
Figure 17:
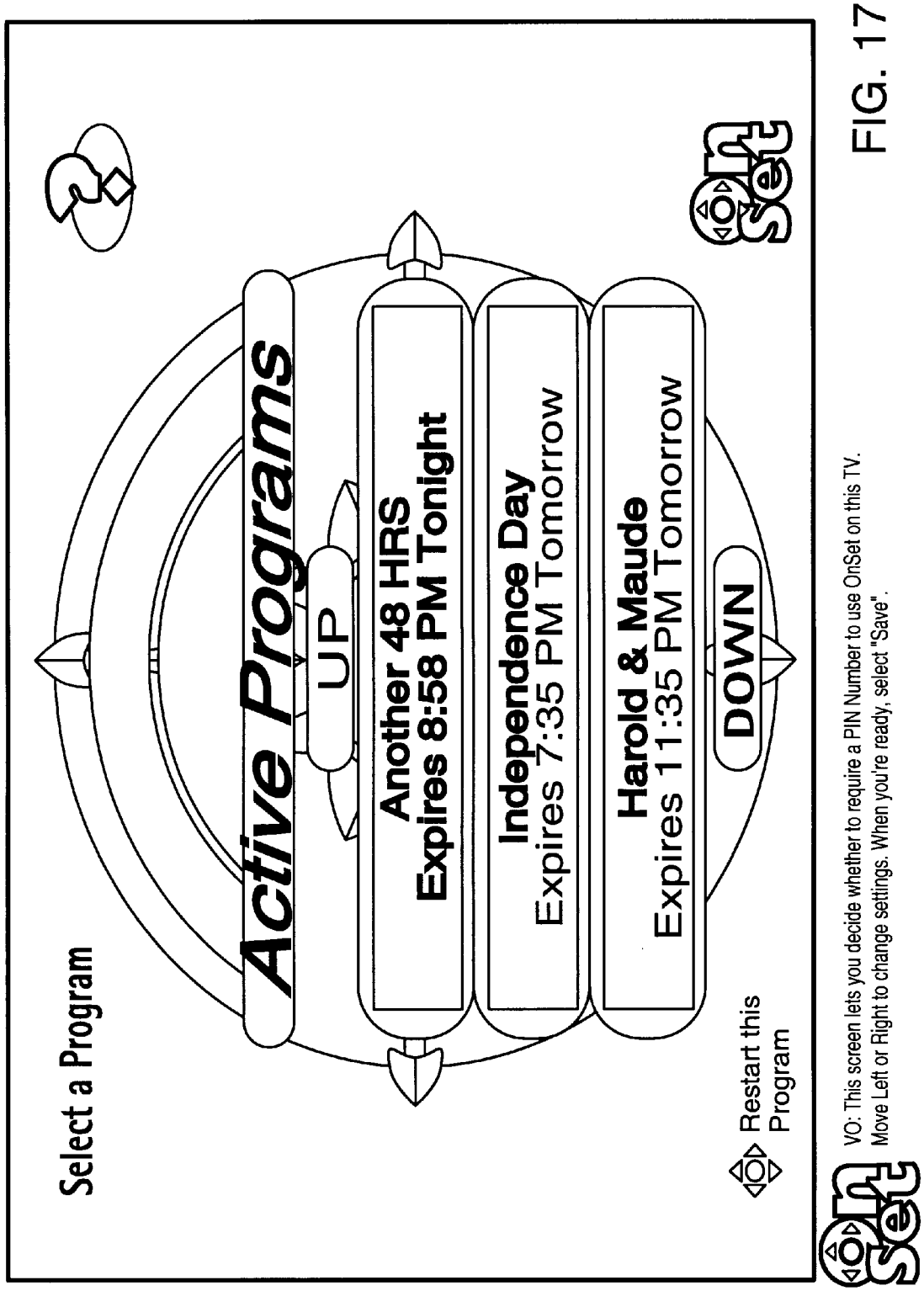
FIG. 17 depicts a active programs screen.
Figure 18:
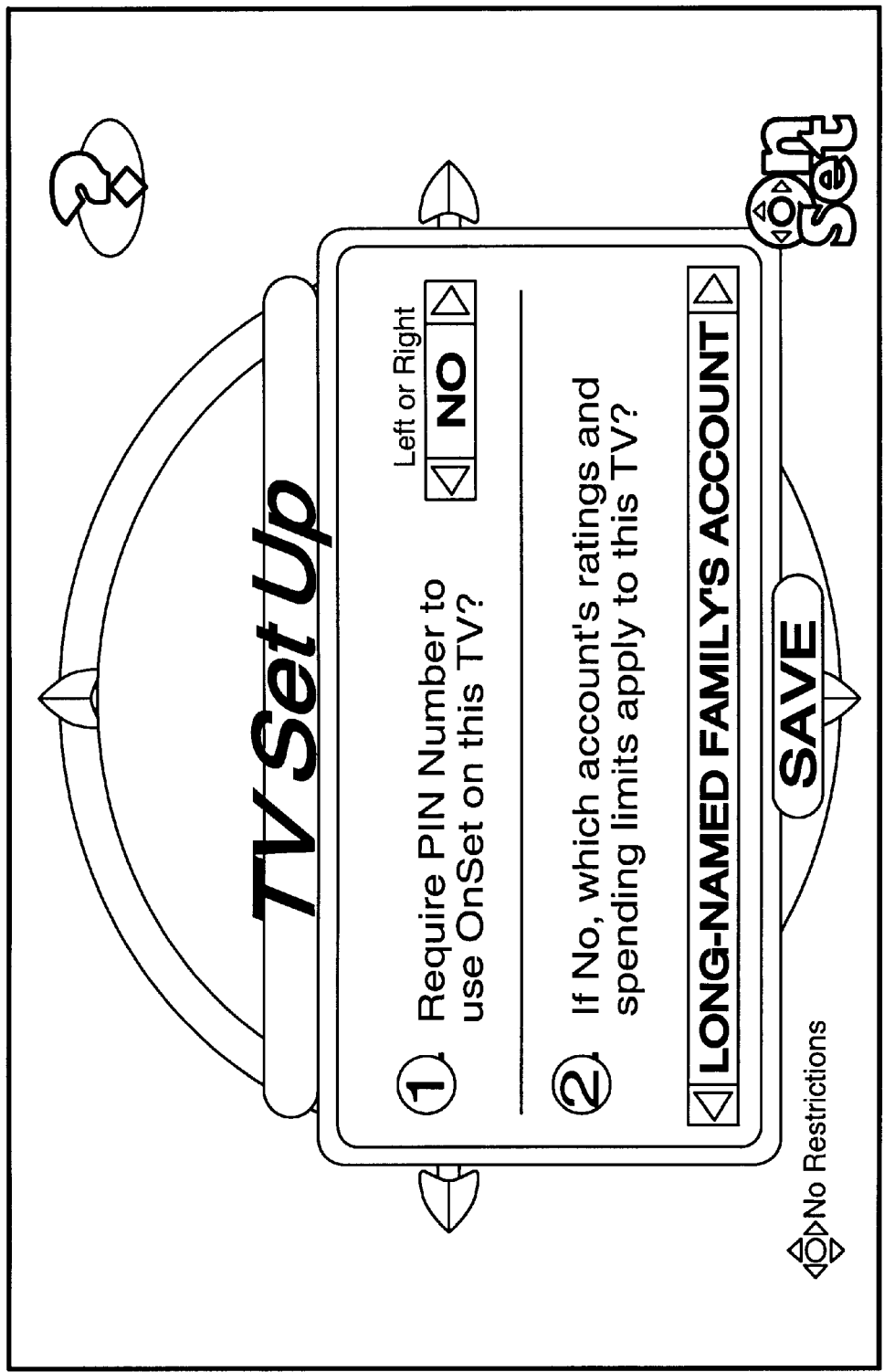
FIG. 18 depicts a TV set up menu.

FIGS. 3 and 10 depict illustrative menu imagery (a "compass" menu screen 300) used to select movies available from the information distribution system. All the information, as well as control instructions, to produce such a menu is contained in an applet downloaded from the service provider equipment. As such, the service provider equipment stores the applets in server memory such that each applet can be rapidly recalled and routed to a set top terminal for display.

The illustrated menu screen 300 contains background video 302 that contains the menu structure. The background video also produces the text and other fixed graphics, e.g., the compass 304. An overlay or foreground video of typically transparent on-screen display (OSD) bitmap graphics 306 (shown in phantom proximate each user selectable graphic or icon) is positioned atop the background video 302. Typically, one region of the foreground video is highlighted to identify the present selectable menu region or icon. As shall be described below, these OSD graphics are produced and controlled by the OSD graphics processor within the video decoder in the set top terminal.

The background video comprises a video layer, while the overlay or foreground video comprises a graphics layer. The generation of both the video layer and graphics layer is controlled by a control layer. Briefly, the video layer comprises displayed video images produced using, e.g., information contained in an applet. The graphics layer comprises OSD overlay(s) including graphical objects that are associated with applets stored in either subscriber or provider equipment. The OSD overlay(s) are displayed over the video layer. The control layer comprises a command processing and logical operations layer. The control layer retrieves the applets associated with graphic layer objects selected by a user, executes the applets, and provides video information to the video layer and object information to the graphics layer.

The applet may also carry audio information that would "play" when a particular event occurred or specific menu object selected. Additionally, an animation object could be carried in the applet to allow certain objects to become animated when selected.

Generally, when a user selects a particular icon, the graphic object in the overlay plane is altered to de-emphasize or emphasize the icon or the video underlying the graphic object. In other words, the object is altered from one state to another state to facilitate the emphasis/de-emphasis of a particular region of the menu.

In one embodiment of the invention, when a user selects a highlighted icon, the OSD graphic proximate that icon is immediately altered to acknowledge the selection. The alteration is typically a change of color of the transparent overlay such that the icon "glows". To effectuate this OSD alteration, each menu field represented by the region is defined by a pair of linked lists. One pair of linked lists in the menu is always active, i.e., there is always some region of the screen that is highlighted.

Alternatively, the OSD graphics may produce an opaque overlay that is made transparent (or partially transparent) when the region containing the overlay, or some other region, is selected. As such, the underlying video that lies beneath the overlay is revealed. Such a mask and reveal process enables the video to contain regions of imagery that are revealed upon selection, where these regions provide the user with recognizable and enjoyable information generally relating to the selection that was made or generally providing an enjoyable transition to the next screen. Furthermore, the mask and reveal process can be used to periodically mask and reveal certain imagery without the subscriber selecting any regions. This function may be used to merely provide a graphical enhancement to the display, i.e., emphasis and de-emphasis of particular menu regions.

The applet logic responds to the user commands entered through the remote control by activating different linked lists (i.e., moving a starting link pointer), or by adding, removing, or changing the mix of regions in the active list. The applet logic also tells the CPU which command sequence terminates the applet and which response to send to the video session manager. The applet logic contains a table of command sequences that are identified with specific coordinates defining the field locations on the menu.

The function of the navigator is generated through the use of Navigator descriptor files. These files are used as the basis for construction of all navigator applet screens. A navigator descriptor file defines specific objects (e.g., graphical bitmap, audio, animation and the like) to be used, their physical location on the navigator menu screen, and their interactions with the subscriber's remote control actions. The navigator asset builder software program uses the navigator descriptor files to generate the final pseudo MPEG bitstream that is sent to the set top terminal. The asset builder reads the objects as defined by the navigator asset builder and combines them with the appropriate control information also contained in the navigator descriptor files.

The navigator descriptor files are written in an HTML like language syntax specifically designed for this application. Each definition type starts with an angle bracket "<" immediately preceding the definition name. The definition type ends with an angle bracket, a forward slash "</" and then the definition name. Definitions can be nested. The navigator description file for building an applet having bitmap objects includes the following type definitions:

REGION: Lists all of the bitmaps that reside within an individual region on the screen, their specific locations within the region, and palette specific information for each bitmap.

PALETTE: Defines a palette of one or more colors.

BUTTON: Defines a control that appears as one or more previously defined bitmaps on the subscriber's television and can cause actions to take place (primarily messages sent upstream) when the subscriber presses the SELECT button on the remote control while the button is highlighted.

LIST: Defines a control that consists of one or more bitmaps (usually a rectangular region of constant color) that is overwritten with TEXT sent from the upstream process and rasterized onto the region. Generally the text remains visible and the background colors change per subscriber selection.

STATIC: Defines a control that consists of one bitmap (usually a rectangular region of constant color) into which upstream text is rastorize and made visible no matter what the subscriber selects with the remote control.

EDIT: Defines a control that consists of one bitmap (usually a rectangular region of constant color) into which user entered text (as in numbers from the remote control are rasterized. The text generally remains visible for that entire applet. The background color changes as the subscriber selects or unselects the edit region. Edit controls also can exhibit the behavior that require a predefined number of characters to be entered by the subscriber through the remote control before any other buttons or controls can be actuated.

ACTION: Messages that are formatted and sent upstream via the back channel when the subscriber presses the SELECT button while the corresponding ACTION control is highlighted.

Figure 7:
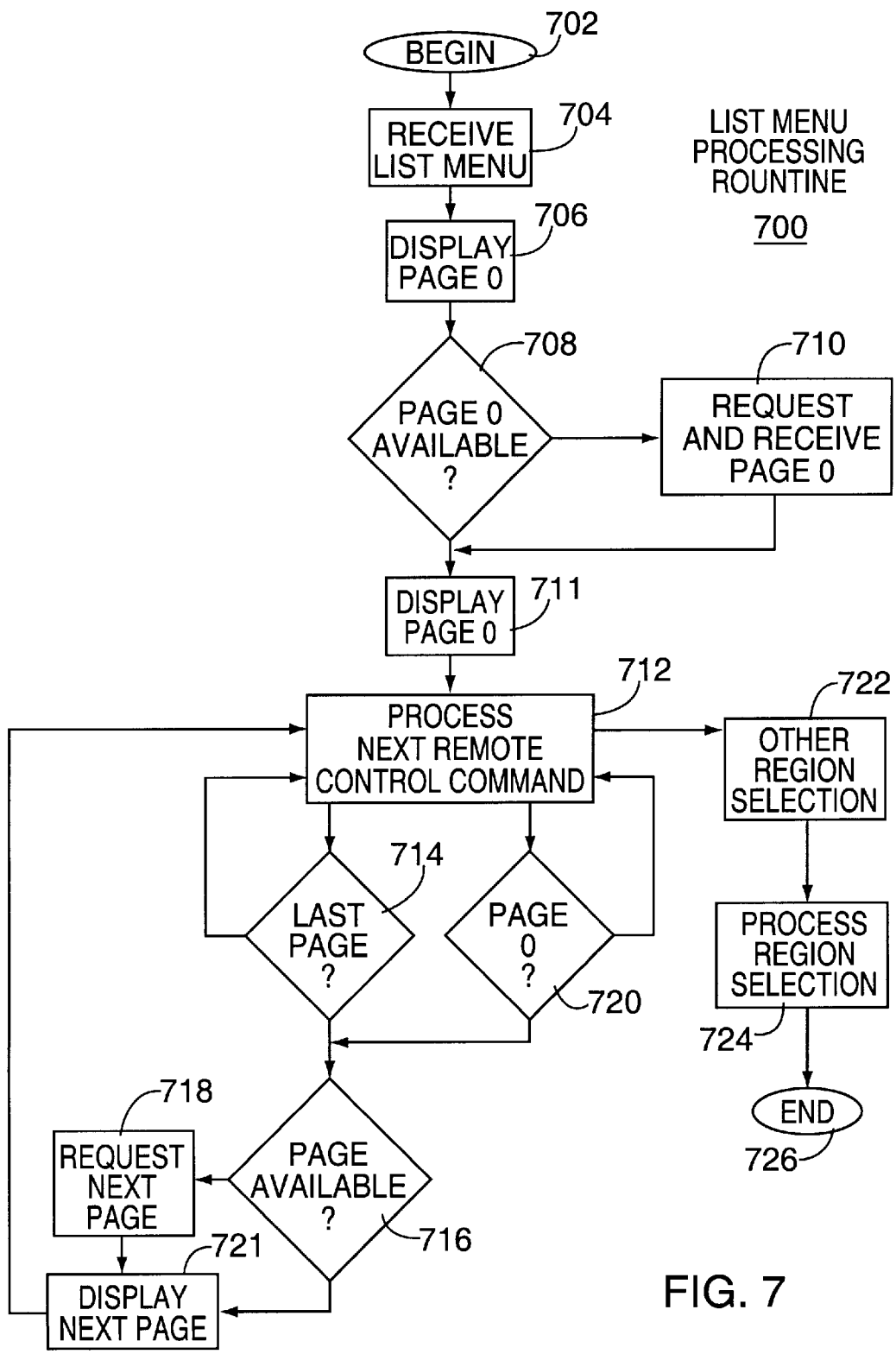
FIG. 7 depicts a flow diagram of list information processing routine.
Figure 19:
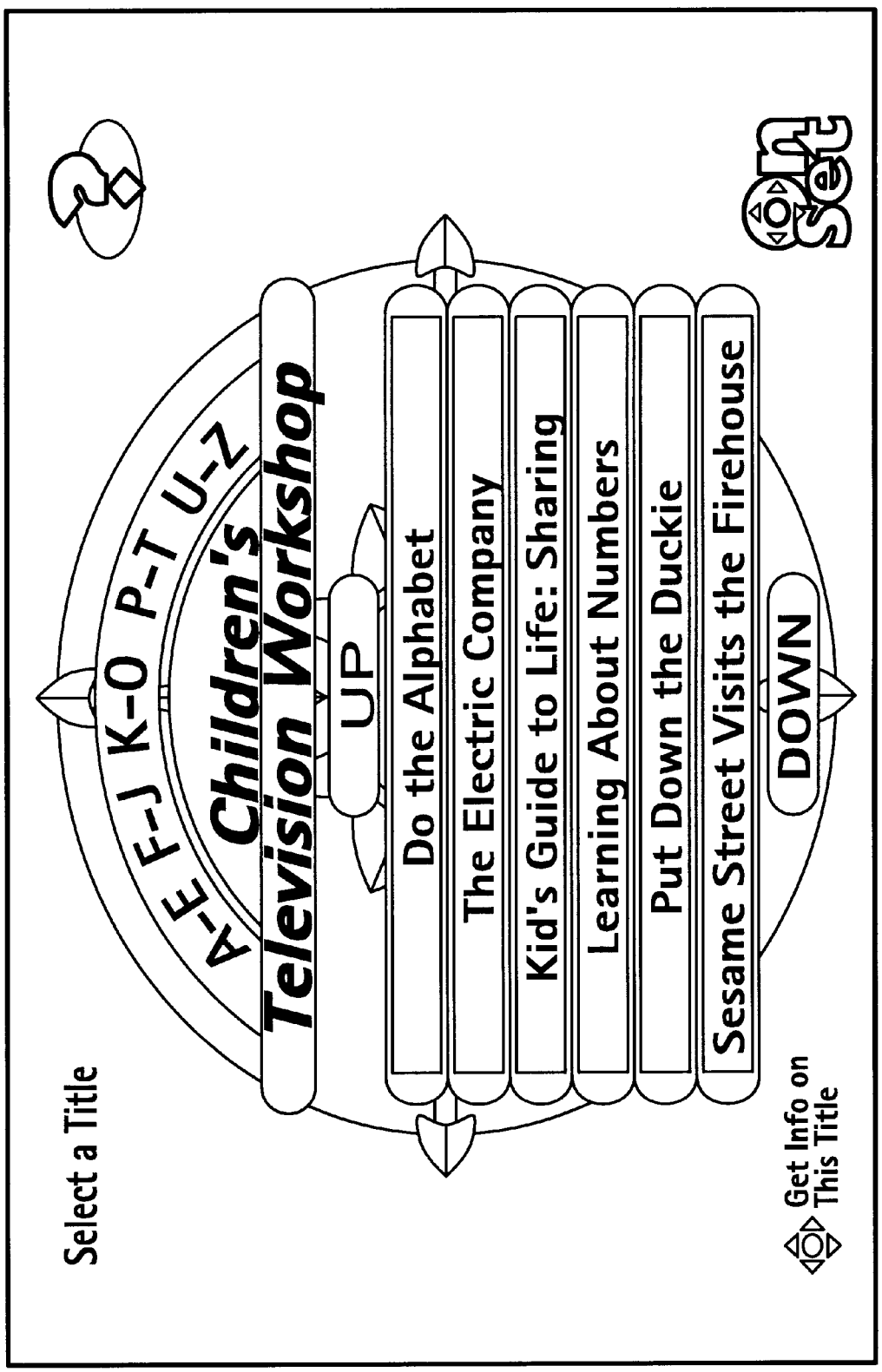
FIG. 19 depicts a list menu.

For example, a Navigator Descriptor File for a List Screen (LAZ) such as that which appears in FIG. 19 and whose operation is discussed with respect to FIG. 7 is structured as follows:

```
<SCREEN name=LAZ>
        ########### Define Regions ##################
        <REGION MIX=3>
                <BMP NAME=UpLevelInfo FILE=/ms/bmp/
                up_mme¯2 X=88 Y=398 BG=0>
        </REGION>
                <BMP NAME=UpInfo FILE=/ms/bmp/listup¯2
X=88
                Y=398 BG=0>
        </REGION>
        <REGION MIX =3>
                <BMP NAME=Chop FILE=/dv/chopstr X=555
Y=394
                        BG=14>
                <BMP NAME=ChopInfo FILE=/ms/bmp/chop_m¯2
                X=88 Y=398 BG=0>
        </REGION>
        </REGION MIX=2>
                <BMP NAME=Up FILE=/ms/bmp/list¯1 X=287
                Y=166 BG=0>
                <BMP NAME=line1 FILE=dv/line X=163 Y=205
                BG=1>
                <BMP NAME=line2 FILE=/dv/line X=163 Y=236
                BG=1>
                <BMP NAME=line3 FILE=/dv/line X=163 Y=267
                BG=1>
        </REGION>
        </REGION MIX=2>
                <BMP NAME=line4 FILE=/dv/line X=163 Y=298
                BG=1>
        </REGION>
        </REGION MIX=2>
                <BMP NAME=line5 FILE=/dv/line X=163 Y=329
                BG=1>
                <BMP NAME=line6 FILE=/dv/line X=163 Y=360
                BG=1>
                <BMP NAME=ChopTop FILE=/dv/chopsttp X=555
                Y=355 BG=14>
        </REGION>
        <REGION>
                <BMP NAME=AEInfor FILE=/ms/bmp/list_a¯1
                X=88 Y=392 BG=0>
        </REGION>
        <REGION>
                <BMP NAME=FJInfo FILE=/ms/bmp/list_f¯1
                X=88 Y=392 BG=0>
```

-continued

```
        </REGION>
        <REGION>
                <BMP NAME=KOInfo FILE=/ms/bmp/list_k¯1
                X=88 Y=392 BG=0>
        </REGION>
        <REGION>
                <BMP NAME=PTInfo FILE=/ms/bmp/list_p¯1
                X=88 Y=392 BG=0>
        </REGION>
        <REGION>
                <BMP NAME=UZInfo FILE=/ms/bmp/list_u¯2
                X=88 Y=392 BG=0>
        </REGION>
        <REGION>
                <BMP NAME=Down FILE=/ms/bmp/list_d¯12
                X=286 Y=388 BG=0>
                <BMP NAME=DownInfo FILE=/ms/bmp/list_d¯2
                X=88 Y=392 BG=0>
        </REGION>
        </REGION MIX=6>
                <BMP NAME=SAUSAGE FILE=/dv/sausage
                BG=14 X=178 Y=53>
                <BMP NAME=AE FILE=/dv/ae BG=14 X=178
                Y=53>
                <BMP NAME=FJ FILE=/dv/fj BG=14 X=178
                Y=53>
                <BMP NAME=KO FILE=/dv/ko BG=14 X=178
                Y=53>
                <BMP NAME=PT FILE=/dv/pt BG=14 X=178
                Y=53>
                <BMP NAME=UZ FILE=/dv/uz BG=14 X=178
                Y=53>
        </REGION>
        </REGION MIX=3>
                <BMP NAME=Help FILE=/ms/bmp helpst¯1
                X=555 Y=8 BG=2>
        </REGION>
        <REGION>
                <BMP NAME=HelpInfo FILE=/ms/bmp/help_9¯1
                X=88 Y=392 BG=0>
        </REGION>
        <REGION>
                <BMP NAME=ListInfo FILE=/ms/bmp/list_t¯1
                X=88 Y=398 BG=0>
        </REGION>
        <REGION>
                <BMP NAME=UpLevel FILE=/ms/bmp/up_mme¯1
                X=274 Y=24 BG=0>
##### Define Special Palettes ##############
<PALETTE NAME=off>
                <RGB 0 150 150 TRANSPARENT>
                <RGB 0 0 0>
</PALETTE>
<PALETTE NAME=active>
                <RGB 0 255 179>
                <RGB 0 0 0>
</PALETTE>
</PALETTE NAME=BON>
                <RGB 255 255 255 TRANSPARENT>
</PALETTE>
<PALETTE name=HighLite>
                <RGB 0 255 179>
                <RGB 0 0 0>
</PALETTE>
######### Define Controls ##############
<LISTBOX NAME=listbox ON=active OFF=off
SEL-LISTSEL FONT=0>
                <GOTO N=Up S=Down>
                <GOTO E=Chop>
                <TAB TYPE=CENTER STOP=188>
                <TAB TYPE=LEFT STOP=188>
                <ENTRY ASC=line1>
                <ENTRY ASC=line2>
                <ENTRY ASC=line3>
                <ENTRY ASC=line4>
                <ENTRY ASC=line5>
                <ENTRY ASC=line6>
                <FOCUS ASC=ListInfo ON=ListInfo>
                <ACTION MSG=SELECT>
```

-continued

```
        <FADE>
            <SENDSTRINGS LISTSEL>
        </ACTION>
</LISTBOX>
<BUTTON NAME=DOWN>
        <FOCUS ASC=Down ON=Down>
        <FOCUS ASC=DownInfo ON=DownInfo>
        <GOTO N=listbox E=Chop>
        <ACTION MSG=SELECT>
            <PGDOWN LIST=listbox>
        </ACTION>
</BUTTON>
<BUTTON NAME=Up>
        <FOCUS ASC=Up ON=Up>
        <FOCUS ASC=UpInfo ON=UpInfo>
        <GOTO S=listbox N=KO>
        <ACTION MSG=SELECT>
            <PGUP LIST=listbox>
        </ACTION>
</BUTTON>
<BUTTON NAME=UpLevel>
        <FOCUS ASC=UpLevel ON=UpLevel>
        <FOCUS ASC=UpLevelInfo ON=UpLevel Info>
        <GOTO S=KO E=Help>
        <ACTION MSG=SELECT>
            <FADE>
            <TRANSITION DIR=U>
        </ACTION>
</BUTTON>
</BUTTON NAME=AE>
        <FOCUS ASC=SAUSAGE ON=BON>
        <FOCUS ASC=AE ON=HighLite>
        <FOCUS ASC=AEInfo ON=AEInfo>
        <GOTO S=Up E=FJ N=UpLevel>
        <ACTION MSG=SELECT>
            <SENDSTRINGS AE>
        </ACTION>
</BUTTON>
<BUTTON NAME=FJ>
        <FOCUS ASC=SAUSAGE ON=BON>
        <FOCUS ASC=FJ ON=HighLite>
        <FOCUS ASC=FJInfo ON=FJInfo>
        <GOTO S=Up E=KO W=AE N=UpLevel>
        <ACTION MSG=SELECT>
            <SENDSTRINGS FJ>
        </ACTION>
</BUTTON>
<BUTTON NAME=KO>
        <FOCUS ASC=SAUSAGE ON=BON>
        <FOCUS ASC=KO ON=HighLite>
        <FOCUS ASC=KOInfo ON=KOInfo>
        <GOTO S=Up E=PT W=FJ N=UpLevel>
        <ACTION MSG=SELECT>
            <SENDSTRINGS KO>
        </ACTION>
</BUTTON>
<BUTTON NAME=PT>
        <FOCUS ASC=SAUSAGE ON=BON>
        <FOCUS ASC=PT ON=HighLite>
        <FOCUS ASC=PTInfo ON=PTInfo>
        <GOTO S=Up E=UZ W=KO N=UpLevel>
        <ACTION MSG=SELECT>
            <SENDSTRINGS PT>
        </ACTION>
</BUTTON>
<BUTTON NAME=UZ>
        <FOCUS ASC=SAUSAGE ON=BON>
        <FOCUS ASC=UZ ON=HighLite>
        <FOCUS ASC=UZInfo ON=UZInfo>
        <GOTO S=Up W=PT E=Help N=UpLevel>
        <ACTION MSG=SELECT>
            <SENDSTRINGS UZ>
        </ACTION>
</BUTTON>
<BUTTON NAME=Help>
        <FOCUS ASC=Help ON=Help>
        <FOCUS ASC=HelpInfo ON=HelpInfo>
        <GOTO W=UZ>
        <GOTO S=Chop>
```

-continued

```
        <ACTION MSG=SELECT>
            <FADE>
            <TRANSITION DST=HLS DIR=D>
        </ACTION>
</BUTTON>
<BUTTON NAME=Chop>
        <FOCUS Chop ASC=Chop ON=Chop>
        <FOCUS ChopInfo ASC=ChopInfo ON=ChopInfo>
        <FOCUS ChopTop ASC=ChopTop ON=ChopTop>
        <GOTO W=Down>
        <GOTO N=Help>
        <ACTION MSG=SELECT>
            <FADE>
            <TRANSITION DST=MME DIR=J>
        </ACTION>
</BUTTON>
</SCREEN>
```

Figure 8:
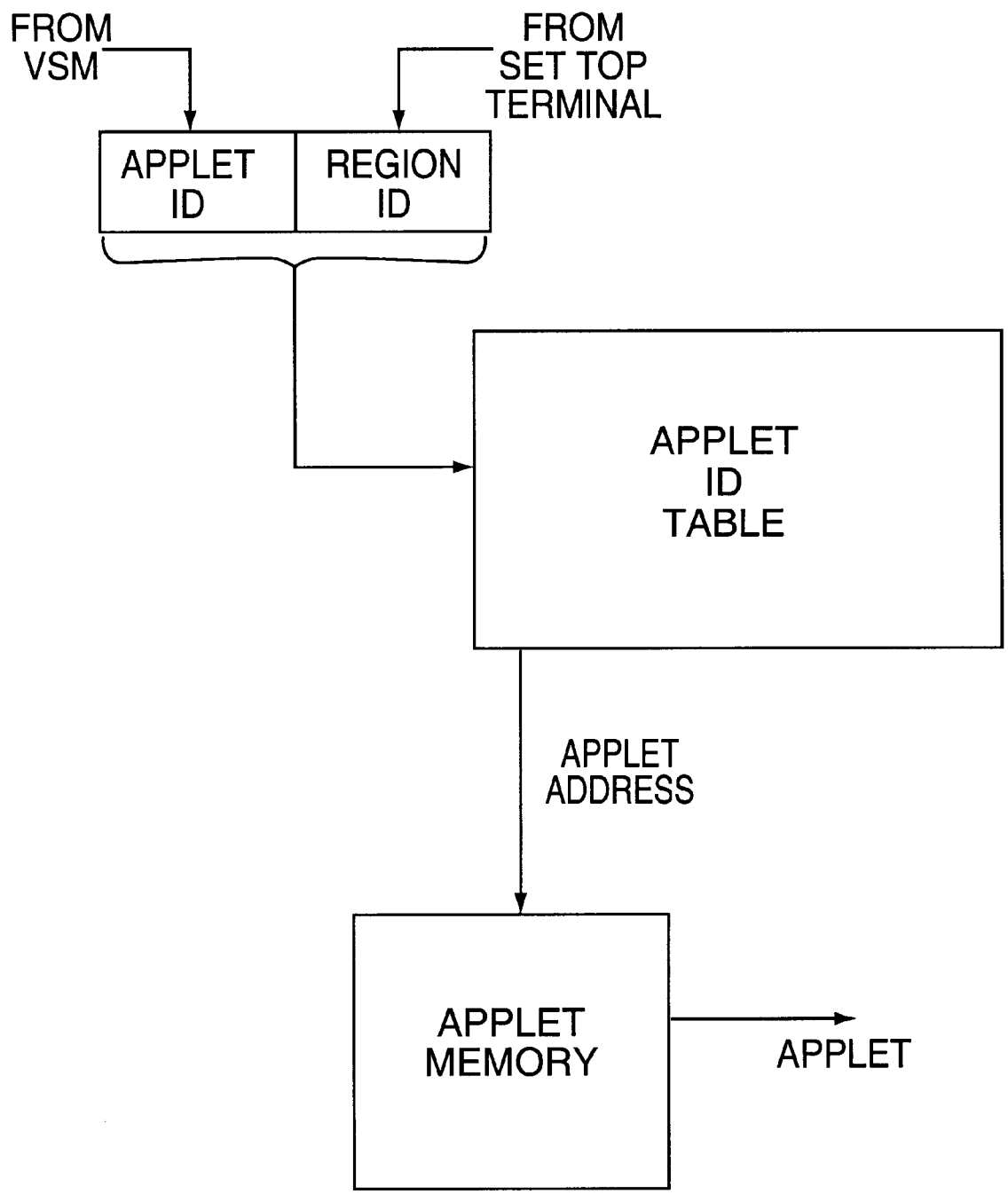
FIG. 8 depicts a flow process for retrieving and transmitting an applet.
Figure 9:
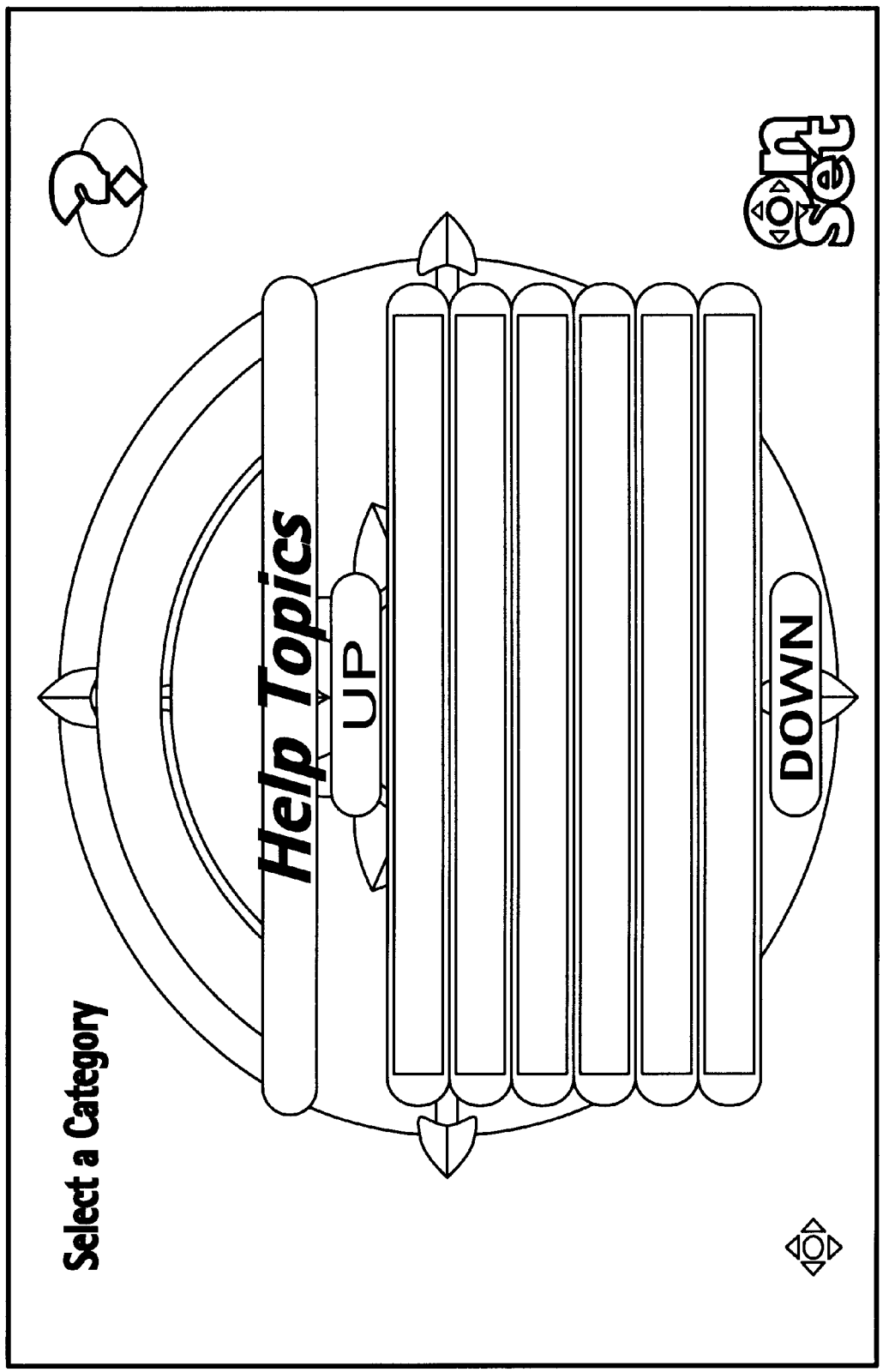
FIG. 9 depicts a help menu.

As shown in FIG. 8, an address (region ID) identifying the selected region is transmitted to the video session manager. The video session manager concatenates the region address with an address of the applet within which the region selection was made. The concatenated address is used to identify an entry (an applet ID) in an applet table. This applet ID indicates the applet that is to be sent to fulfill the subscriber's request. The AID may also identify a movie or other multimedia information that is to be transmitted. The specific applet routine identified by the applet ID is recalled from memory and forwarded to the set top terminal for execution. The set top terminal then performs a function identified by the applet, e.g., decode the signals with assets (applet decoding), decode signals without assets (decode applet without any controls except return), decode movie from beginning, or decode movie from middle. As such, the set top terminal does not perform any high level functions, the terminal, in most instances, merely functions as a video decoder and command interpreter.

Figure 4:
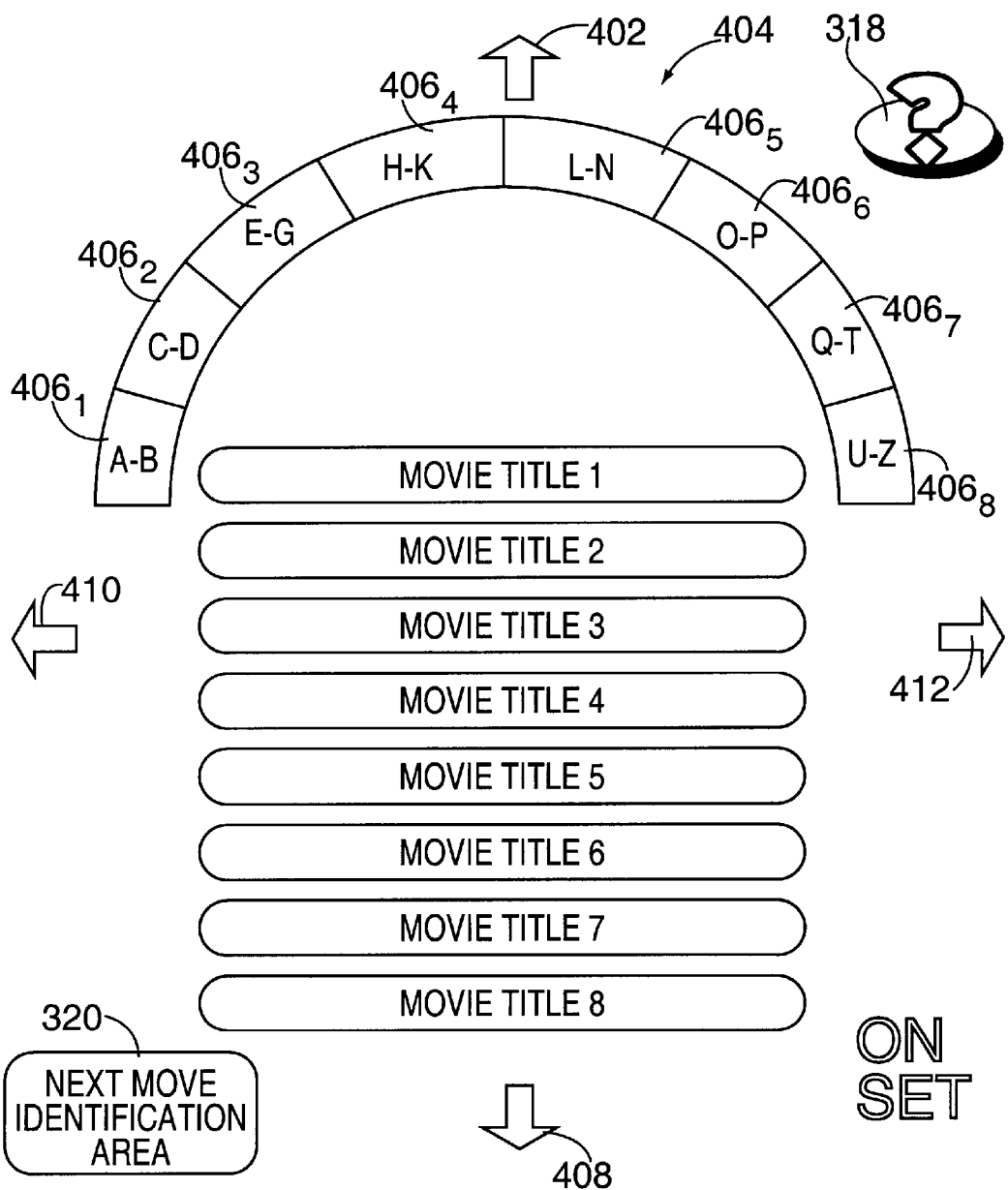
FIG. 4 depicts a second illustrative "list" menu display containing a text list of selections.

Returning to FIGS. 3 and 10, each menu is linked to other menus as a linked list such that selection of a particular icon results in another applet being downloaded and another menu being generated. In addition to textual icons, the menu 300 contains a "compass" 304. This compass forms a "spatial mnemonic" through which a subscriber navigates through the various menu screens. For example, the east and west arrows (310 and 312) link to menus that are conceptually lateral to the present menu. Such menus that are lateral to, for example, the movie explorer menu 300 are new movie promotional clips and a special interest list menu. The north arrow 314 links to a previous menu. The south arrow is generally non-functional in the particular menu shown. Other icons on the menu 300 include a help icon 318 and a current highlighted region description area 320. As such, area 320 provides a short description of the presently highlighted region, e.g., the explanation of "Movies A–Z" is shown. Selecting region 324 executes an applet that produces a "list menu", as described with respect to FIGS. 4 and 19 below. Other icons link to short multimedia "clips". For example, the "Coming Soon" icon 322 links to a series of promotional clips or graphics that advertise movies that will soon be available. The "On Set" icon 316, when selected, leads back to the initial menu into the navigator or some other high level point in the navigator tree. The "On Set" icon appears on every menu to provide an direct link to a higher level of the navigator from any menu.

For example, selecting the "Movies A–Z" textual icon 324 links to an alphabetical menu (see menu 400 of FIG. 4 and 19) that presents an alphabetical list 402 of all the available movies. The arcuate menu region 404 contains a plurality of alphabetic ranged segments 406$_n$ (where n is an integer value) that, when selected, presents a menu list containing the movie titles in the selected alphabetic range. The subscriber can then scroll through the alphabetical list 402 using the up arrow icon 402 to move to a previous page of movies and the down arrow 408 to move to a following page. Manipulating the joystick will sequentially highlight the movie titles until a desired title is highlighted. Selecting a name of a movie causes that movie to be sent to the set top terminal for presentation. The left and right arrows 410 and 412 move to similar lists in parallel menus, e.g., moving from an alphabetical list of comedies may move to an alphabetical list of dramas and so on. When an arrow (or any icon) is highlighted, a move identifier area 320 presents a short description of the menu that will be presented if that icon is selected.

Prior to completing a transaction for purchase of a movie or other service, other applets are downloaded to the set top terminal which form menus stating the price of the selection, confirming the selection, showing a preview prior to purchase, and the like.

An illustrative set of particular menus used by the system are shown in FIGS. 9–19. These menus include: a help menu (FIG. 9) containing a list of help topics; a compass menu (FIG. 10) as discussed above; a movie information screen (MIS) (FIG. 11) containing a movie abstract as well as a preview button, buy button, "on set" button and help button; a movie preview screen (FIG. 12) containing a region for a video preview to be played, arrow buttons to next/previous preview, buy button, information (MIS) button and on set button; guarantee screen (FIG. 13); set up menu (FIG. 14) containing fields for entering a rating limit, a spending limit and a PIN as well as a save button and an on set button; a list menu (FIG. 15) illustrating set up information; an account summary screen (FIG. 16); an session summary menu (FIG. 17) containing the active programs associated with present PIN; a TV set up menu (FIG. 18); an alphabetical listing menu (FIG. 19) as previously described. At the bottom of each of the screens depicted in FIGS. 13–18 is printed an example of the audio voice over (VO) that is reproduced as each screen is displayed.

Figure 5:
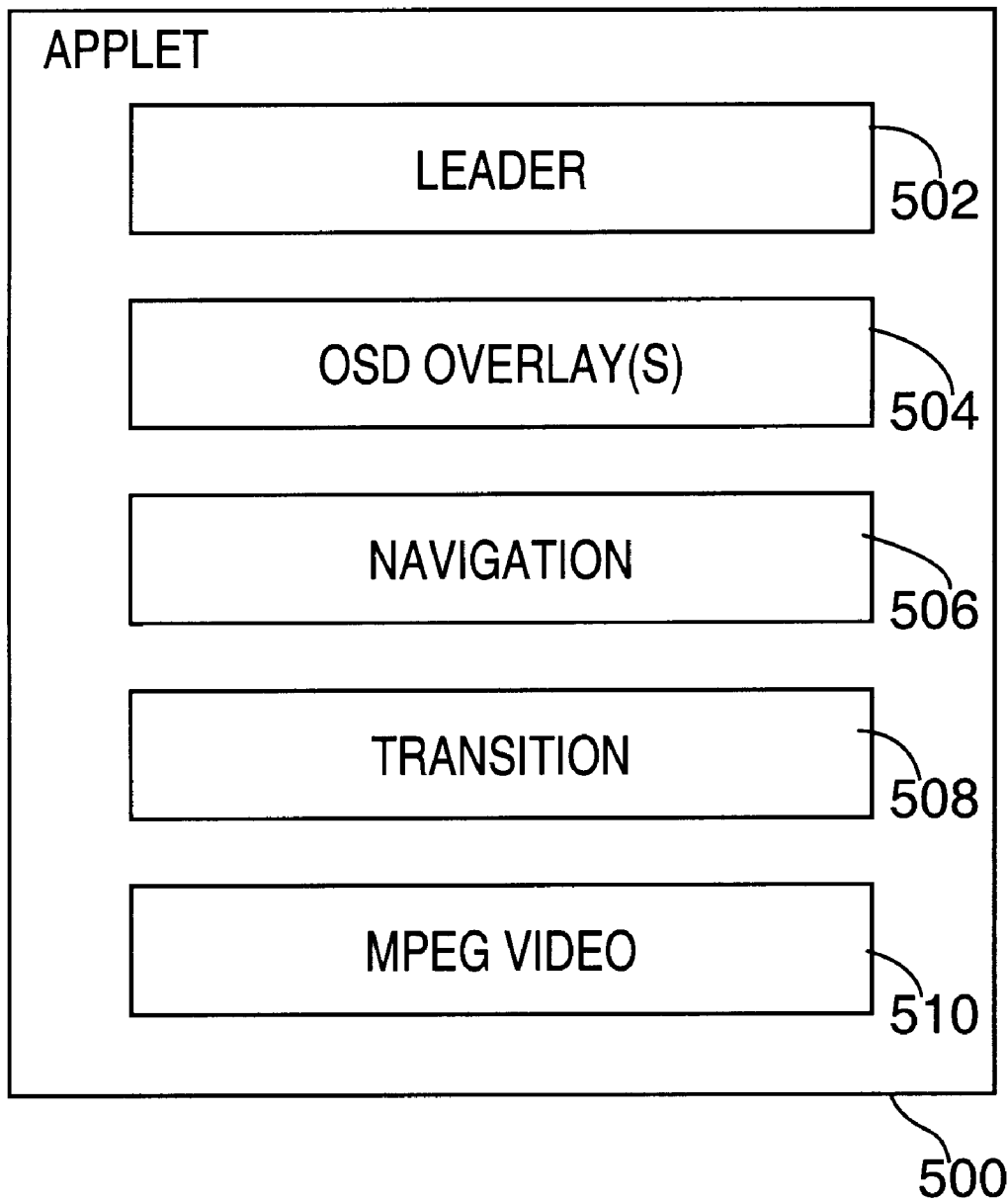
FIG. 5 depicts a schematic illustration of the content of an applet.

FIG. 5 depicts a schematic diagram of the contents of the portion of an applet 500 that is transmitted via the information channel to implement each of the menus. Separately, the descriptor file is transmitted via the command channel (or alternatively the information channel) such that the functions of the applet can be implemented. A descriptor file for each menu may be transmitted and stored (or prestored) in the set top terminal. Specifically, the applet 500 contains a leader 502, OSD overlay graphics 504, navigator control instructions 506, transition signal 508, and compressed (e.g., MPEG) background video 510. As such, upon selection of an icon in a given menu, an applet for the linked menu is transmitted from server to the set top terminal. That applet carries the background video and the OSD overlays as well as all instructions necessary to implement the functions of the menu. The video session manager maintains the linked list (menu tree) of applet interrelations such that when the set top terminal sends a command via the back channel, the video session manager interprets the command and causes the server to send the appropriate applet. The applet begins with the leader 502 which is followed by the OSD overlays 502 which are decoded by the OSD decoder while the remainder of the applet is being processed. The navigation control instructions 504 facilitate overlay activation and transition control. The transition signal is generally a packet that identifies the end of the navigator information and the beginning of the new MPEG video. Lastly, the new MPEG video signal is sent and presented in combination with the OSD graphics. At some point in the menu structure, the subscriber selects a movie title and the video session manager causes the server to send the selected movie.

Figures 6, 6A:
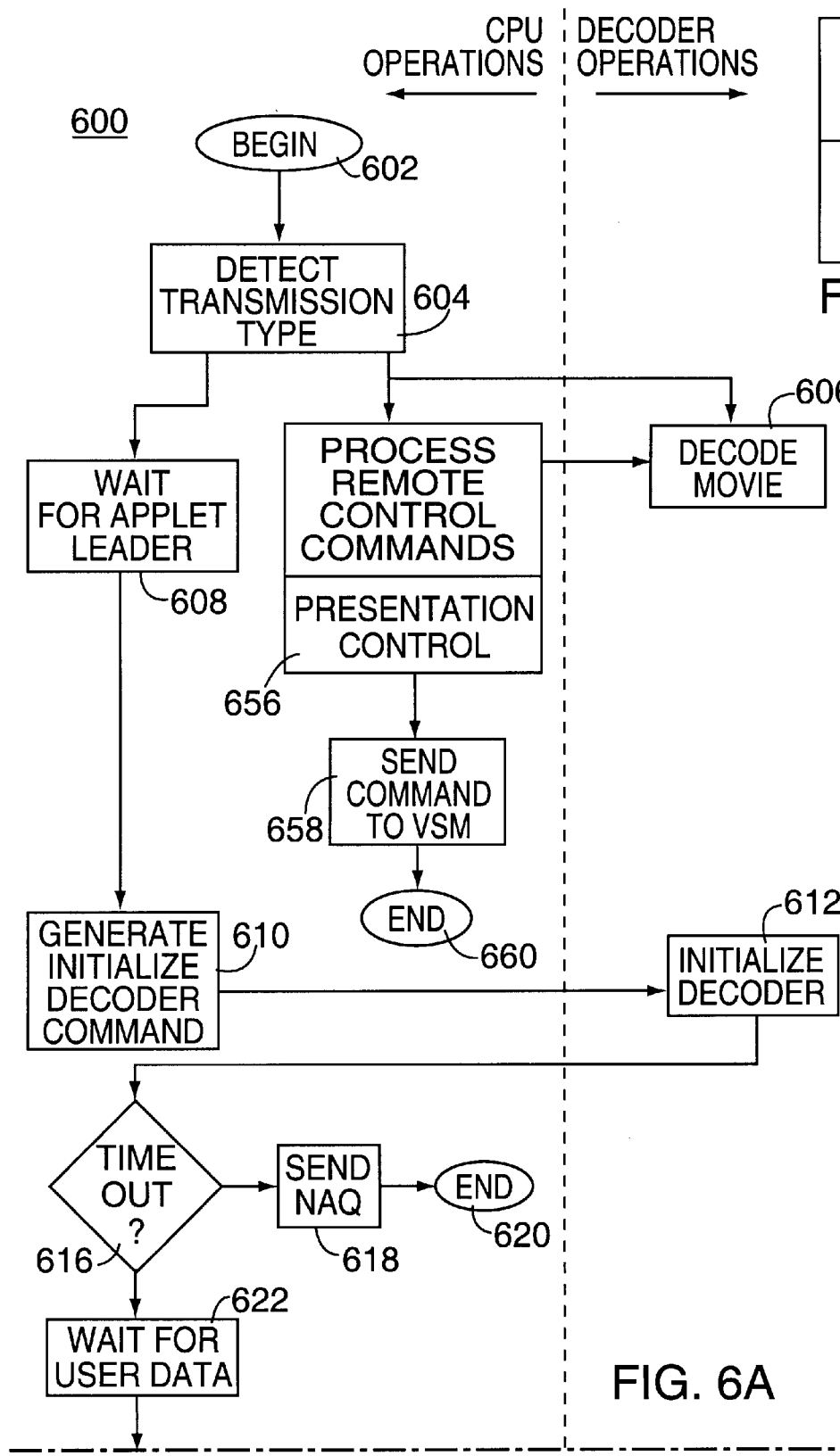
FIG. 6 depicts the appropriate alignment of FIGS. 6A and 6B.
FIGS. 6A and 6B, taken together, depict a flow diagram of an applet transmission and execution routine.
Figure 6B:
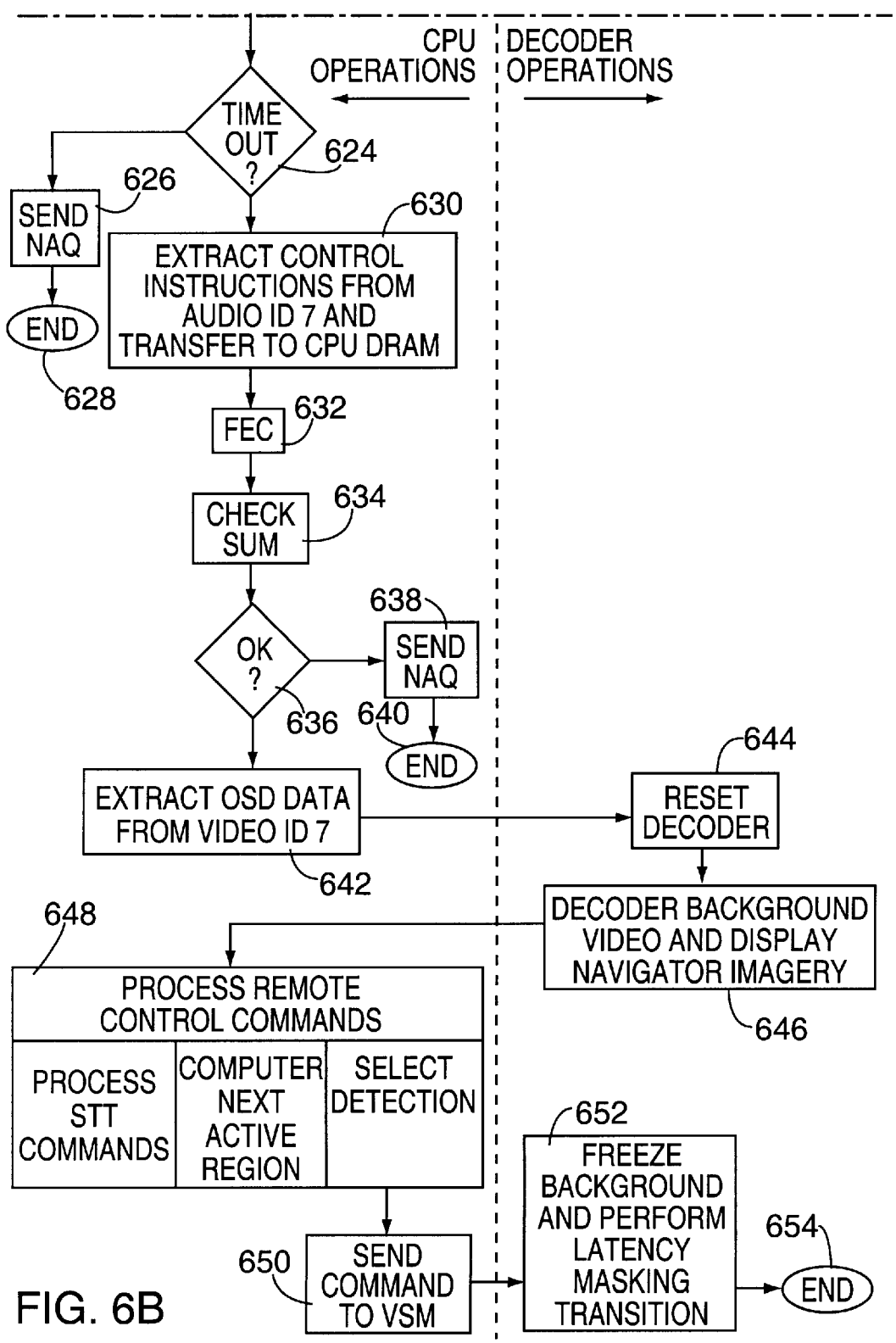

FIG. 6 depicts the appropriate alignment of FIGS. 6A and 6B. These figures, taken together, depict an applet transmission and execution routine 600. The diagram depicts the portion of the routine handled by the CPU on the left and the portion of the routine handled by the OSD decoder on the right. The CPU primarily handles control layer functions, while the OSD decoder primarily handles graphics layer functions. The routine 600 begins with step 602 and proceeds to step 604. The CPU detects, at step 604, the type of transmission being received. Specifically, the CPU detects whether the transmission is a movie or a navigator applet. An applet is identified by the video packet sequence containing a particular stream identification code, e.g., VIDEO ID 7. If the transmission is a movie, the video decoder begins, at step 606, decoding the movie. The movie decoding process is controlled by the CPU via step 656. At step 656, the CPU processes any movie presentation control commands generated by the remote control. As such, the CPU sends, at step 658, the presentation control command to the video session manager to facilitate changing the presentation. The routine ends at step 660.

If, at step 604, an applet is detected, the routine awaits, at step 608, for the applet leader. At step 610 and 612, the set top terminal CPU initializes the decoder and sets certain buffer pointers. In particular, the applet contains a video stream having VIDEO ID 7 carrying the OSD graphics, an audio stream having AUDIO ID 7 carrying the applet control instructions, and a video stream carrying the background video. To process these applet components, the CPU must store the OSD graphics and the instructions in special memory locations to avoid interference with the normal operation of the video decoder. As such, at steps 610 and 612, the CPU initializes the decoder's VIDEOID stream ID to 7 and sets the video stream elect (VSS) bit. The OSD data is delimited by a user packet hat indicates that the OSD data download is complete. Further, the CPU sets a video input buffer pointer to an OSD region of the decoder DRAM. As such, all video packets having an ID of 7 are routed to the OSD region of the memory. Similarly, the set top terminal CPU initializes the decoder AUDIOID stream ID to 7 and sets the audio stream select enable (ASE) bit. Also, the audio input buffer pointer is set to a temporary memory location of the decoder DRAM. This storage location is temporary because the instructions carried in the AUDIO ID 7 packets are ultimately copied to the CPU DRAM for execution.

At step 616, the routine queries whether an excessive amount of time has elapsed between detection of an applet and reception of the applet. If the query is affirmatively answered, the set top terminal sends, at step 618, a negative acknowledgment (NAQ) signal through the back channel to the video session manager. The routine ends at step 620. Upon receiving the NAQ signal, the video session manager will resend the applet.

If the query at step 616 is negatively answered, the routine proceeds to step 622. At step 618, the set top terminal begins receiving the applet, i.e., the CPU detects the user data packet. At step 624, the routine queries whether an excessive amount of time has elapsed between detection of a user data packet and reception of the data. If the query is affirmatively answered, the set top terminal sends, at step 626, a negative acknowledgment (NAQ) signal through the back channel to the video session manager. The routine ends at step 628.

Upon receiving the NAQ signal, the video session manager will resend the applet.

At step 630, the control instructions within packets carrying AUDIOID 7 are extracted from the packets and stored in the CPU DRAM. At step 632, forward error correction is performed on the extracted bits. Additionally, at step 634, a check sum is created to ensure that the extracted control instructions are correct. At step 636, the CPU queries whether the check sum was correct. If the check sum is correct, the routine proceeds to step 642. However, if the query is negatively answered, the routine sends a NAQ to the video session manager and ends at step 640 to await retransmission of the applet.

At step 642, the OSD data within packets having a VIDEOID 7 are extracted from the packets and stored in the OSD region of the decoder DRAM. The payload of these packets is one or more bitmap images to be used by the applet. The OSD images are loaded directly into the start of the OSD data space. Subsequent packets (for VIDEOID 7) contain consecutive portions of the OSD image(s). An OSD image compiler leaves space at the beginning of each packet for actual MPEG synchronization codes. To indicate the end of the OSD transmission, a "user data" packet of up to 96 bytes in length is inserted into the video stream between the OSD packet stream and the background video stream.

At step 644, the CPU resets the video decoder to enable it to receive the background video transmission. At step 646, the video decoder begins to decode the background video and display that navigator imagery to the subscriber. The OSD overlays are also processed by the decoder and displayed in accordance with the descriptor file for the menu being displayed.

At step 648, the routine processes navigator commands from the remote control. These commands include all those associated with an applet with assets as well as an applet without assets. Note that an applet without assets has a single return button displayed for selection. Thus, the joystick is disabled, but the select function operates in the same manner as an applet with assets. At step 648, the CPU processes the three types of navigator commands: local set top terminal commands such as on/off, volume, channel selection; joystick directional vectors; and region selection. The vectors are processed to determine which region should next be highlighted. When a selection is made, the CPU sends, at step 650, a command to the video session manager to facilitate the transmission of a movie or applet.

At step 652, to facilitate a transition, the routine freezes the background video and prepares the set top terminal for the next applet or video transmission. In addition, the CPU executes a latency masking process as disclosed in commonly assigned U.S. patent application Ser. No. 08/738,361 filed Oct. 25, 1996. The applet ends at step 654.

Although many OSD graphics are sent within the VIDEOID 7 stream through the forward information channel, some OSD graphics are transmitted to the set top terminal through the command channel. Specifically, so-called "list screen" data is sent through the command channel. This data contains a textual list of characters to be used in a menu and is transmitted in ASCII form at the beginning of an applet transmission. The CPU converts the ASCII character list into OSD bitmap images and stores those images for subsequent use.

FIG. 7 depicts a flow diagram of a list information processing routine 700 for generating a list menu such as those depicted in FIGS. 4, 9, 15 and 19. The routine is executed by the CPU upon requesting a list menu. The routine begins at step 702 and proceeds to step 704. At step 704, the CPU receives a list menu from the service provider. The menu applet contains an instruction for the CPU to display page 0 of list text that forms the menu. The list text is an ASCII page of text. The page 0 request is processed at step 706. At step 708, the routine queries whether page 0 is available in the CPU cache. If the query is negatively answered, the CPU requests the page 0 text from the service provider and awaits its arrival. If page 0 is available in the cache, the CPU retrieves and uses the cached page to generate the text menu (at step 711). The CPU converts the ASCII text into one or more OSD bitmap images using an EEPROM based font and kerning table. The CPU stores the OSD bitmap in the CPU DRAM. As the OSD lists are displayed, the CPU moves the necessary OSD graphic images to the video decoder OSD memory. The list menu is in the form of that shown in FIG. 4.

Such display is performed on a paginated basis. At step 712, the CPU monitors the remote control for a new selection, e.g., up arrow, down arrow, and select a particular region. If a down arrow is selected, the routine proceeds to step 714. At step 714, the routine queries whether the display is presently showing the last page of the list menu. If the query is affirmatively answered, the routine returns to step 712. If the query at step 714 is negatively answered, the routine proceeds to step 716 to determine whether the next subsequent page is cached. If the page is not cached, the CPU requests, at step 718, the next page from the service provider. The new page is used to form and display a list menu at step 721. Similarly, if an up arrow is selected, the routine checks if the previous page is in cache. If the page is in cache, the CPU uses the cached page. However, if the page is not available, the CPU requests the service provider to send the page.

If, at step 712, the routine detects that a region other than an up or down arrow is selected, the routine proceeds to step 722. At step 724, the routine processes the region selection in the same manner as described above for processing and displaying a new menu that is identified by the region selected. The routine ends at step 726.

The method and apparatus of the present invention provide an interactive menu structure (navigator) for an information distribution system such as a video-on-demand system. The navigator provides an enjoyable, interactive experience with full motion background video and active graphics that indicate when a selection is made by altering their appearance. All this functionality is brought to the set top terminal within an applet for each displayed menu. Consequently, the set top terminal does not require an expensive processor nor a large amount of memory. As such, the invention allows the set top terminal in an information distribution system to remain relatively inexpensive.

Although various embodiments which incorporate the teachings of the present invention have been shown and described in detail herein, those skilled in the art can readily devise many other varied embodiments that still incorporate these teachings.

What is claimed is:

1. An on-screen program guide for use in subscriber equipment in an interactive information distribution system, said on-screen program guide comprising:

a graphics layer, for displaying one or more graphical objects, said graphical objects being associated with respective applets stored in provider equipment, said applets, when executed by said subscriber equipment, display menu information and associated image information;

a video layer, for displaying still or moving images, including still or moving images generated using said applet image information; and a control layer, coupled to said graphics layer and said video layer, for generating an applet request in response to a selection of a graphical object; wherein, each of a plurality of said applets provides a respective portion of on-screen program guide information.

2. The on-screen programming guide of claim 1, wherein additional graphical objects are generated using said applet menu information included within said executed applet.

3. The on-screen programming guide of claim 2, wherein said additional graphical objects are associated with respective applets stored in said provider equipment or said subscriber equipment.

4. The on-screen programming guide of claim 3, wherein said applets are linked together using said graphical objects to form an interactive menu structure for selecting information offerings available from said provider equipment.

5. The on-screen programming guide of claim 1, wherein:

said graphics layer comprises a plurality of regions, each region having a respective graphic object; and said graphic objects are selected by selecting a region associated with a desired graphic object.

6. The on-screen programming guide of claim 5, wherein said graphic object has a first state until a selection is made, then said graphic object has a second state to emphasize or de-emphasize images within said video layer.

7. The on-screen programming guide of claim 6, wherein said first state and said second state of said graphic object have different opacity.

8. The on-screen programming guide of claim 1, wherein:

one of said graphics layer and said video layer comprises a spatial mnemonic for imparting menu flow information indicative of a lateral menu structure and a previous menu structure, said menu flow information logically related to a preceding sequence of executed applets.

9. The on-screen programming guide of claim 1, wherein said control layer comprises:

an input device, coupled to a controller, for selecting an object displayed in said graphics layer, thereby requesting said applet associated with said selected object;

a transmitter, coupled to said controller, for transmitting to said information provider, via a back channel, a request for said selected applet;

a receiver, coupled to said controller, for receiving from said information provider, via an information channel, an information stream including said requested applet; and a video signal generator, coupled to said controller, for generating display information for said graphics layer and said video layer.

10. Subscriber apparatus for use in interactive information distribution system, said interactive information distribution system comprising an information stream for receiving information from information provider equipment, and a back channel for transmitting information requests to said information provider equipment, said subscriber apparatus comprising:

a receiver, coupled to a controller, for receiving said information stream;

a transmitter, coupled to said controller, for transmitting information requests to said information provider equipment; and a video signal generator, coupled to said controller, for generating a video signal derived from information included in said information stream;

an input device for selecting one of a plurality of graphical objects included in said video signal, said graphical objects being associated with respective applets stored in information provider equipment, said applets comprising menu information and associated image information; and said controller, in response to said input device, causing an applet request to be transmitted to said information provider equipment, and in response to a reception of an information stream including said requested applet, executing said applet to produce graphical object information and video information for said video signal generator; wherein, each of a plurality of said applets provides a respective portion of on-screen program guide information.

11. In an interactive information distribution system having service provider equipment coupled, through a communications network, to subscriber equipment containing at least a television, apparatus for providing navigation menus comprising:

means for transmitting, through said communications network, a menu applet as a portion of an information stream;

means, within said subscriber equipment and coupled to said communications network, for receiving said menu applet; and processing means, coupled to said receiving means, for executing said menu applet to display an interactive menu within the subscriber equipment; wherein, each of a plurality of said menu applets provides a respective portion of on-screen program guide information.

12. The apparatus of claim 11 wherein said menu applet comprises:

a graphics portion;

an instruction portion; and a background video portion.

13. The apparatus of claim 12 wherein said processing means produces on-screen display graphics for said menu from said graphics portion, produces applet instructions for controlling said menu operation from said instruction portion; and produces background video for said menu from said background portion.

14. The apparatus of claim 11 wherein said receiving means further comprises a demodulator for demodulating said information stream containing said applet.

15. The apparatus of claim 11 wherein said processing means comprises:

a video decoder; and a central processing unit.

16. A subscriber-side method for retrieving information in an interactive information distribution system comprising, said method comprising the steps of:

(a) selecting, using an input device, one of a plurality of displayed graphical objects;

(b) transmitting to an information provider, via a back channel of a communications network, a request for an applet associated with said selected graphical object;

(c) receiving from said information provider, via an information channel of said communications network, said requested applet;

(d) executing said received applet to produce a navigation menu comprising graphical objects associated with other applets, said navigation menu superimposed over a video image, said video image produced using information included in said executed applet; and (e) repeating steps (a) through (d) until a desired result is achieved; wherein, each of a plurality of said menu applets provides a respective portion of on-screen program guide information.

17. A method for generating an interactive menu comprising the steps of:

receiving a transmission of a menu applet containing instructions, graphics and background video;

extracting said instructions from said applet;

storing said instructions;

extracting said graphics from said applet;

storing said graphics;

decoding said background video using said decoder; and displaying a menu having said background video with said graphics overlaid thereupon and operating said menu in accordance with said instructions; wherein, each of a plurality of said applets provides a respective portion of on-screen program guide information.

18. The method of claim 17 wherein said displaying step further comprises the steps of:

overlaying a certain portion of said background video with said graphics;

changing a state of the graphics from a first state to a second state to emphasize or de-emphasize said certain portion of said background video.

19. The method of claim 18 wherein said first state has a different opacity than said second state of said graphics.

20. The method of claim 17 wherein said displaying step further comprises the steps of:

covering a certain portion of said background video with a transparent graphic within said graphics; and changing a state of the graphics from opaque to transparent to highlight said certain portion of said background video.

21. An applet for defining menus within a menu structure of an interactive information distribution system comprising:

a descriptor file comprising a region descriptor that defines objects that reside in a particular region of a menu, a function descriptor for defining operations that occur when a particular object is selected, and a message descriptor for defining the particular message that is sent through the interactive information distribution system when a particular object is selected; wherein, each of a plurality of said applets provides a respective portion of said menu structure.

22. The applet of claim 21 wherein said objects comprise one or more of the following: graphical bitmaps, audio objects, or animation objects.

23. The applet of claim 22 wherein said function descriptor comprises a plurality of descriptors for defining a color and transparency level of the color for a particular graphical bitmap.

* * * * *

UNITED STATES PATENT AND TRADEMARK OFFICE
CERTIFICATE OF CORRECTION

PATENT NO. : 6,208,335 B1  
DATED : March 27, 2001  
INVENTOR(S) : Gordon et al.

Page 1 of 1

It is certified that error appears in the above-identified patent and that said Letters Patent is hereby corrected as shown below:

<u>Column 18, claim 16,</u>  
Line 54, delete "comprising".

Signed and Sealed this

Fifth Day of March, 2002

Attest:

JAMES E. ROGAN  
Attesting Officer     *Director of the United States Patent and Trademark Office*